US012576361B2

(12) United States Patent
    Zhu et al.

(10) Patent No.:  US 12,576,361 B2
(45) Date of Patent:      Mar. 17, 2026

(54) DEVICES AND METHODS FOR GAS PURIFICATION TREATMENT

(71) Applicant: HARBIN INSTITUTE OF TECHNOLOGY SHENZHEN, Shenzhen (CN)

(72) Inventors: Rongshu Zhu, Shenzhen (CN); Qitong Zhao, Shenzhen (CN); Manyu Zhu, Shenzhen (CN)

(73) Assignee: HARBIN INSTITUTE OF TECHNOLOGY SHENZHEN, Shenzhen (CN)

( * ) Notice: Subject to any disclaimer, the term of this patent is extended or adjusted under 35 U.S.C. 154(b) by 808 days.

(21) Appl. No.: 17/809,902

(22) Filed: Jun. 30, 2022

(65) Prior Publication Data

US 2022/0331739 A1     Oct. 20, 2022

Related U.S. Application Data

(63) Continuation of application No. PCT/CN2020/141342, filed on Dec. 30, 2020.

(30) Foreign Application Priority Data

Dec. 30, 2019    (CN) .......................... 201911396167.3

(51) Int. Cl.
     B01D 53/86          (2006.01)
(52) U.S. Cl.
     CPC ......... B01D 53/869 (2013.01); B01D 53/864 (2013.01); B01D 2255/2073 (2013.01);
     (Continued)

(58) Field of Classification Search
     None
     See application file for complete search history.

(56) References Cited

U.S. PATENT DOCUMENTS 6,136,186 A     10/2000  Gonzalez-Martin et al.
2002/0168305 A1*  11/2002  Morrow .................. C01B 13/10
                                                    422/186.3

FOREIGN PATENT DOCUMENTS

CN          1330254 A       1/2002
CN          2756997 Y       2/2006
            (Continued)

OTHER PUBLICATIONS

Huang et al. CN104857824A—translated document (Year: 2015).*
(Continued)

*Primary Examiner* — Jelitza M Perez
(74) *Attorney, Agent, or Firm* — METIS IP LLC

(57)                ABSTRACT
A device for gas purification treatment may include: a light oxidation reactor, a light source being disposed in the light oxidation reactor, the light source being configured to emit first light and second light, the light oxidation reactor being configured to perform a first-stage purification treatment on a gas under irradiation of the first light; a catalytic ozone oxidation reactor configured for second-stage purification treatment of the gas; a photocatalytic reactor configured to perform a third-stage purification treatment on the gas under irradiation of the second light; wherein, the photocatalytic reactor is adjacent to the light oxide reactor, and the photocatalytic reactor and the light oxide reactor are separated by a light transmittance component, so that the second light passes through the light transmittance component into the photocatalytic reactor.

19 Claims, 9 Drawing Sheets

(52) U.S. Cl.
CPC ................. *B01D 2255/802* (2013.01); *B01D 2257/7027* (2013.01); *B01D 2259/802* (2013.01); *B01D 2259/804* (2013.01); *B01D 2259/806* (2013.01)

(56) References Cited

FOREIGN PATENT DOCUMENTS

| | | | |
|---|---|---|---|
| CN | 101590347 A | | 12/2009 |
| CN | 104857824 A | * | 8/2015 |
| CN | 104906951 A | | 9/2015 |
| CN | 204672112 U | | 9/2015 |
| CN | 206232428 U | | 6/2017 |
| CN | 107281918 A | | 10/2017 |
| CN | 207478275 U | | 6/2018 |
| CN | 108636107 A | | 10/2018 |
| CN | 208161368 U | | 11/2018 |
| CN | 110152481 A | | 8/2019 |
| CN | 110368790 A | | 10/2019 |
| CN | 110975560 A | | 4/2020 |
| CN | 211886179 U | | 11/2020 |
| JP | H105323 A | | 1/1998 |
| JP | 2011125390 A | * | 6/2011 |

OTHER PUBLICATIONS

Shimura et al. JP2011125309A—translated document (Year: 2011).*

First Office Action in Chinese Application No. 201911396167.3 mailed on Sep. 29, 2024, 18 pages.

International Search Report in PCT/CN2020/141342 mailed on Mar. 31, 2021, 8 pages.

Written Opinion in PCT/CN2020/141342 mailed on Mar. 31, 2021, 10 pages.

Fang, Xiaojian, Research on Dynamic Disinfection of Indoor Air Applying UV and Catalytic Ozonation, Dissertation for the Master Degree in Engineering, 2013, 71 pages.

* cited by examiner

1151

1152

115

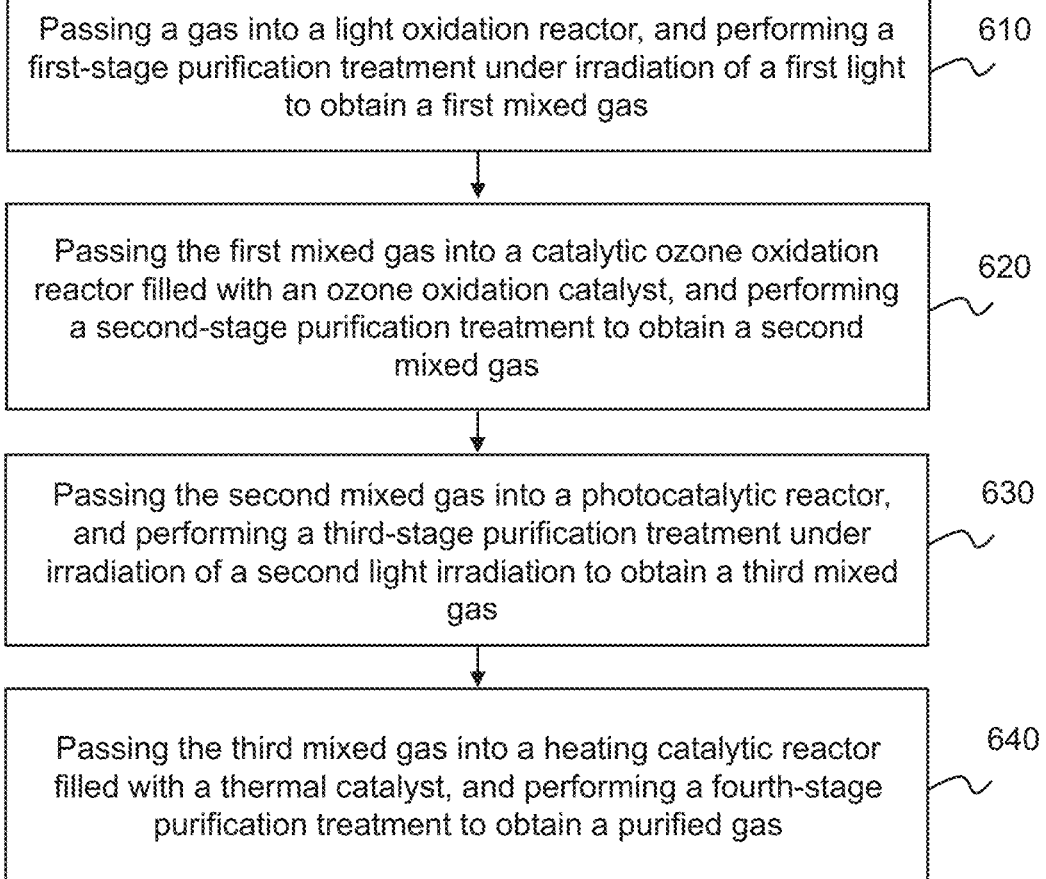

Passing a gas into a light oxidation reactor, and performing a first-stage purification treatment under irradiation of a first light to obtain a first mixed gas   610

Passing the first mixed gas into a catalytic ozone oxidation reactor filled with an ozone oxidation catalyst, and performing a second-stage purification treatment to obtain a second mixed gas   620

Passing the second mixed gas into a photocatalytic reactor, and performing a third-stage purification treatment under irradiation of a second light irradiation to obtain a third mixed gas   630

Passing the third mixed gas into a heating catalytic reactor filled with a thermal catalyst, and performing a fourth-stage purification treatment to obtain a purified gas   640

FIG. 6

DEVICES AND METHODS FOR GAS PURIFICATION TREATMENT

CROSS-REFERENCE TO RELATED APPLICATIONS

This application a continuation of International Application No. PCT/CN2020/141342, filed on Dec. 30, 2020, which claims priority of Chinese Patent Application No. 201911396167.3, filed on Dec. 30, 2019, the entire contents of which are incorporated herein by reference.

TECHNICAL FIELD

This present disclosure generally relates to a field of gas treatment technology, and in particular, to devices and methods for gas purification treatment.

BACKGROUND

With the continuous development of society and economy, people pay more and more attention to the problem of environmental pollution, and people's awareness of environmental protection is gradually increasing. For example, in industry, a series of gas emission standards are formulated to limit exhaust emissions; in life, the indoor air is purified to keep the indoor air clean. In the process of gas purification, the content of harmful ingredients in the gas after purification needs to meet the discharge requirements or life requirements. Therefore, it is desirable to provide devices and methods for gas purification treatment.

SUMMARY

According to an aspect of the present disclosure, a device for gas purification treatment is provided. The device includes: a light oxidation reactor, a light source being disposed in the light oxidation reactor, the light source being configured to emit first light and second light, the light oxidation reactor being configured to perform a first-stage purification treatment on a gas under irradiation of the first light; a catalytic ozone oxidation reactor that is filled with an ozone oxidation catalyst, and in fluid communication with the light oxidation reactor, the catalytic ozone oxidation reactor being configured for second-stage purification treatment of the gas; a photocatalytic reactor that is filled with a photocatalyst and in fluid communication with the catalytic ozone oxidation reactor, the photocatalytic reactor being configured to perform a third-stage purification treatment on the gas under irradiation of the second light; wherein, the photocatalytic reactor is adjacent to the light oxide reactor, and the photocatalytic reactor and the light oxide reactor are separated by a light transmittance component, so that the second light passes through the light transmittance component into the photocatalytic reactor.

In some embodiments, the first light is vacuum ultraviolet (UV) light; and the second light is UV light.

In some embodiments, the photocatalyst is selected from one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, and a $Sn/S/F/TiO_2/SnO_2$ composite catalyst.

In some embodiments, the first light is vacuum ultraviolet (UV) light; and the second light is ultraviolet light and visible light.

In some embodiments, the photocatalyst is selected from one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, a $Sn/S/F/TiO_2/SnO_2$ composite catalyst, and a $BiVO_4$ catalyst; the $BiVO_4$ catalyst being filled in a side of the photocatalytic reactor away from the light oxidation reactor, and one or more of the $TiO_2$ catalyst, the $TiO_2/SiO_2$ composite catalyst, the $F/TiO_2/SiO_2$ composite catalyst, the $Bi/F/TiO_2/SiO_2$ composite catalyst, the $S/F/TiO_2/SiO_2$ composite catalyst, the $S/Bi/F/TiO_2/SiO_2$ composite catalyst, the $Sn/S/F/TiO_2$ composite catalyst, and the $Sn/S/F/TiO_2/SnO_2$ composite catalyst being filled in a side of the photocatalytic reactor close to the light oxidation reactor.

In some embodiments, the oxygen oxidation catalyst is selected from one or more of a transition metal oxide and a composite catalyst of a transition metal oxide and a molecular sieve.

In some embodiments, the oxygen oxidation catalyst is selected from one or more of a $MnO_2$ catalyst and a composite catalyst of $MnO_2$/molecular sieve.

In some embodiments, the device also comprises a microwave transmitter for exciting the light source to emit the first light and the second light.

In some embodiments, the device also comprises a heating catalytic reactor that is filled with a thermal catalyst and in fluid communication with the light oxidation reactor for a fourth stage purification treatment of the gas.

In some embodiments, the heating catalytic reactor performs microwave heating through the microwave transmitter.

In some embodiments, the microwave transmitter emits microwaves to the photocatalytic reactor.

In some embodiments, the light oxidation reactor is provided with an installation bracket for installation of the light source.

According to another aspect of the present disclosure, a method for gas purification is provided. The method includes: putting a gas into a light oxidation reactor; obtaining a first-stage by performing a first-stage purification treatment on the gas under irradiation of a first light; putting the first mixed gas into a catalytic ozone oxidation reactor filled with an ozone oxidation catalyst, obtaining a second mixed gas by performing a second-stage purification treatment on the first mixed gas; putting the second mixed gas into a photocatalytic reactor filled with a photocatalyst; obtaining a purified gas by performing a third-stage purification treatment on the second mixed gas under irradiation of a second light; wherein, the first light and the second light come from a same light source.

In some embodiments, the first light is vacuum ultraviolet (UV) light; and the second light is UV light.

In some embodiments, the photocatalyst is selected from one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, and a $Sn/S/F/TiO_2/SnO_2$ composite catalyst.

In some embodiments, the first light is vacuum ultraviolet (UV) light; and the second light is ultraviolet light and visible light.

In some embodiments, the photocatalyst is selected from one or more of a $TiO_2$ catalyst, a $TiO_2/SiO_2$ composite catalyst, a $F/TiO_2/SiO_2$ composite catalyst, a $Bi/F/TiO_2/$ $SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, a $Sn/S/F/TiO_2/SnO_2$ composite catalyst, and a $BiVO_4$ catalyst.

In some embodiments, the oxygen oxidation catalyst is selected from one or more of a transition metal oxide and a composite catalyst of a transition metal oxide, and a molecular sieve.

In some embodiments, the oxygen oxidation catalyst is selected from one or more of a $MnO_2$ catalyst and a composite catalyst of $MnO_2$/molecular sieve.

In some embodiments, the light source is excited by microwaves to emit the first light and the second light.

In some embodiments, the method also includes: putting the purified gas into a heating catalytic reactor that is filled with a thermal catalyst, and performing a fourth-stage purification treatment on the purified gas.

In some embodiments, the purified gas in the heating catalytic reactor is heated by using microwaves.

In some embodiments, the third-stage purification treatment is performed under an action of microwave.

In some embodiments, the gas includes volatile organic compounds (VOCS) gas.

In some embodiments, a mineralization rate of toluene in the VOCS gas is more than 92%.

In some embodiments, the gas includes at least one of bacteria, yeast, virus, mold, and dust mites.

In some embodiments, the method is configured to purify at least one of the bacteria, the yeast, the virus, the mold, and the dust mites.

In some embodiments, a killing rate of any one of the bacteria, the yeast, the virus, the mold, and the dust mites is more than 90%.

In some embodiments, the volume space velocity includes $100\text{-}10000H^{-1}$.

In some embodiments, when the kill rate is less than 100%, the volume space velocity is negatively correlated with the kill rate.

BRIEF DESCRIPTION OF THE DRAWINGS

FIG. 6 is a flowchart illustrating an exemplary gas purification treatment method according to some embodiments of the present disclosure;

DETAILED DESCRIPTION

Figure 1:
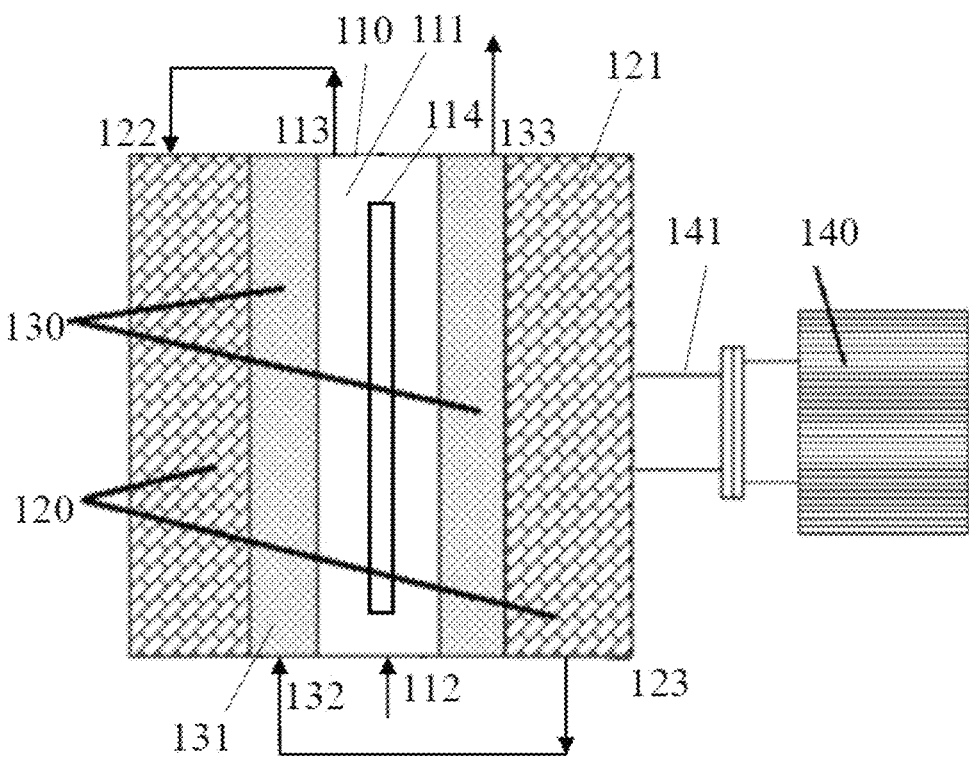
FIG. 1 is a schematic diagram illustrating an exemplary gas purification treatment device according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, sections, or assembly of different levels in ascending order. However, the terms may be displaced by other expressions if they may achieve the same purpose.

As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 2:
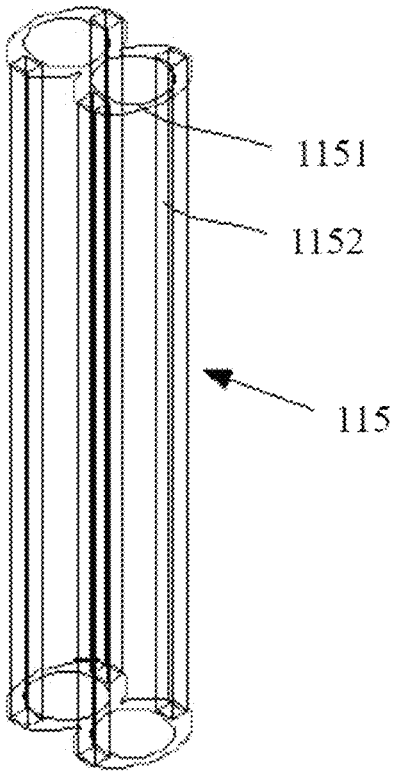
FIG. 2 is a schematic diagram illustrating an exemplary installation bracket according to some embodiments of the present disclosure.
Figure 3:
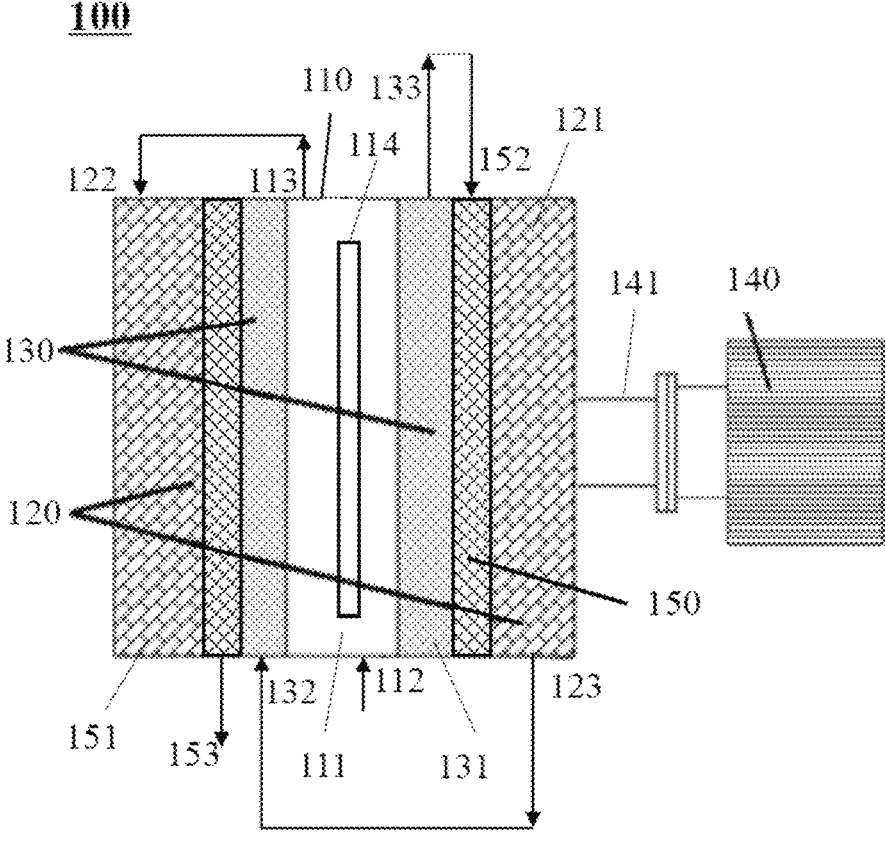
FIG. 3 is a schematic diagram illustrating an exemplary gas purification treatment device according to some embodiments of the present disclosure.

FIG. 1 is a schematic diagram illustrating an exemplary gas purification treatment device according to some embodiments of the present disclosure; FIG. 2 is a schematic diagram illustrating an exemplary installation bracket according to some embodiments of the present disclosure; FIG. 3 is a schematic diagram illustrating an exemplary gas purification treatment device according to some embodiments of the present disclosure.

In some embodiments, the gas purification treatment device may be configured to purify a gas. In some embodiments of this present disclosure, the gas purification treatment may reduce or remove harmful ingredients in the gas. In some embodiments, the harmful ingredients may include ozone, odor, volatile organic compounds (VOCs) gas and kitchen oil fume. In some embodiments, the VOCs gas mainly refers to various organic compounds at a boiling point at 50° C.-260° C. under normal temperature. In some embodiments, the VOCs gas mainly refers to organic compounds with a saturated vapor pressure greater than 70 Pa at room temperature and a boiling point below 260° C. at atmospheric pressure, or all volatile organic compounds with a vapor pressure greater than or equal to 10 Pa at 20° C. In some embodiments, the VOCs may include non-methane hydrocarbons (NMHC), oxygen-containing organic compounds, halogenic hydrocarbons, nitrogen-containing organic compounds, sulfur-containing organic compounds, etc.

In some embodiments of this present disclosure, the gas purification treatment may also reduce or remove biological pollutants in the gas. In some embodiments, the biological pollutants may include bacteria, yeasts, viruses, molds, dust mites, etc.

In some embodiments of this present disclosure, the gas purification treatment may also reduce or remove impurities and biological pollutants at the same time.

The gas purification treatment device 100 will be described in detail below with reference to FIGS. 1-3. As shown in FIG. 1, the gas purification treatment device 100 may include a light oxidation reactor 110, a catalytic ozone oxidation reactor 120, a light catalytic reactor 130, and a microwave transmitter 140.

The light oxidation reactor 110 may be configured for a first-stage purification of the gas. In some embodiments, the shape of the light oxidation reactor 110 may include a hollow cylinder, a hollow oval cylinder, a hollow polygon prism, a hollow spherical, or other shapes. This present disclosure is not limited to this. In some embodiments, the light oxidation reactor 110 has a hollow reaction cavity 111, and the reaction cavity 111 is configured to provide a reaction place for the first-stage gas purification treatment. In some embodiments, the shape of the reaction cavity 111 may include a cylinder, an oval-shaped, a polygon prism, a spherical, or other shapes. The shape of the reaction cavity 111 may be the same as the shape of the light oxidation reactor 110, or it may be different from the shape of the light oxidation reactor 110. For example, the shape of the light oxidation reactor 110 is polygon prism, and the shape of the reaction cavity 111 may be polygon prism or cylindrical. In some embodiments, as shown in FIG. 1, the shape of the light oxidation reactor 110 is cylindrical, the reaction cavity 111 is cylindrical, and the inner diameter (that is, the diameter of the reaction cavity) of the light oxidation reactor 110 may include 10-120 mm. More preferably, the inner diameter of the light oxidation reactor 110 may include 20-110 mm. More preferably, the inner diameter of the light oxidation reactor 110 may include 30-100 mm. More preferably, the inner diameter of the light oxidation reactor 110 may include 40-90 mm. More preferably, the inner diameter of the light oxidation reactor 110 may include 50-80 mm. More preferably, the inner diameter of the light oxidation reactor 110 may include 55-75 mm. More preferably, the inner diameter of the light oxidation reactor 110 may include 60-70 mm. In some embodiments, the height of the light oxidation reactor 110 may be disposed according to actual needs (for example, the flow amount or flow velocity of the gas to be treated), and this present disclosure is not limited to this. For example, the height of the light oxidation reactor 110 is 350 mm. In some embodiments, the light oxidation reactor 110 may also include multiple optical oxidation units. Each light oxidation unit is equivalent to an independent light oxidation reactor. By connecting multiple light oxidation units in parallel, the amount of gas purification may be improved.

In some embodiments, the reaction cavity 111 may include at least one inlet pipe and at least one outlet pipe. At least one inlet pipe and at least one outlet pipe may be disposed according to actual needs, and this present disclosure is not limited to this. In some embodiments, the lower end of the reaction cavity 111 is provided with at least one inlet pipe 112 and the upper end is provided with at least one outlet pipe 113. In some embodiments, the lower end and upper end of the reaction cavity 111 are disposed with at least one rotary connection, thereby the lower end and upper end of the reaction cavity 111 being connected to at least one inlet pipe 112 and at least one outlet pipe 113 through the rotary connection. In some embodiments, the material of the inlet pipe 112 and outlet pipe 113 may be polytrafluoroethylene, polyvinyl chloride, stainless steel, carbon steel or alloy. In some embodiments, the cross-section of the inlet pipe 112 and the outlet pipe 113 may be a circular, a square or other polygons, and the present disclosure is not limited to this. The size of the inlet pipe 112 and outlet pipe 113 may be disposed according to the needs (for example, the flow speed of the gas to be treated), and the present disclosure is not limited to this. For example, the inlet pipe 112 and/or outlet pipe 113 may be a circular pipe with a diameter of 3 mm. In this present disclosure, the gas to be treated may be a gas that needs to be purified. Through at least one inlet pipe 112, the gas to be purified may be introduced into the light oxidation reactor 110 to perform the first-stage gas purification treatment; the gas after the first-stage purification treatment may be discharged from the light oxidation reactor 110 through the outlet pipe 113, and the gas may be passed to other equipment (e.g., the catalytic ozone oxidation reactor 120) or directly discharged into the environment where the gas purification treatment device 100 is located.

In some embodiments, a light source 114 is disposed in the reaction cavity 111, and the light source 114 may emit a first light and a second light. In some embodiments, the first light may be vacuum ultraviolet light, and the second light may be ultraviolet light. In some embodiments, the first light may be vacuum ultraviolet light, and the second light may be ultraviolet light and visible light. The light oxidation reactor 110 may perform first-stage gas purification treatment under irradiation of the first light. A side wall of the light oxidation reactor 110 is made of light transmittance material, so that the second light may penetrate the side wall of the light oxidation reactor 110 and illuminate the outside of the light oxidation reactor 410. In some embodiments, the light transmittance material may include organic glass, ceramic, polycarbonate (PC), etc.

In some embodiments, the light source 114 may include a ultraviolet lamp (for example, a mercury lamp) to provide vacuum ultraviolet light, ultraviolet light, and visible light. In some embodiments, the ultraviolet lamp may be a microwave non-pole ultraviolet lamp. The microwave non-pole ultraviolet lamp may emit the first light and the second light under the exciting of the microwave transmitter 140. For more descriptions of the microwave transmitter 140, please refer to the following content. The shape, size and count of the ultraviolet lamps may be determined according to actual needs (for example, the parameters of the gas to be treated). For example, the ultraviolet lamps may be two microwave non-pole ultraviolet lamps with a diameter of 20 mm and a length of 300 mm. There are generally gaps between multiple ultraviolet lamps, and between the ultraviolet lamps and the light oxidation reactor 110 to facilitate gas flow. In some embodiments, the parameters of the gas may be the flow amount of the gas or the concentration of impurities or biological pollutants in the gas.

In some embodiments, the light oxidation reactor 110 is disposed with the installation bracket 115 to install the light source 114. The shape, count and size of the installation bracket 115 are related to the size and count of the light source 114. This present disclosure is not limited to the shape and count of the installation bracket 115. In some embodiments, as shown in FIG. 2, the installation bracket 115 may include two "8"-shaped installation boards 1151 and four support pillars 1152. The two "8"-shaped installation boards 1151 are arranged opposite to each other to form two sets of through holes for installing the ultraviolet lamp, and the four support pillars 1152 are disposed between the two "8"-shaped installation boards 1151 for connecting and supporting the two installation boards 1151. In some embodiments, the diameter of the "8"-shaped installation board 1151 may be 21 mm, and the ends of the ultraviolet lamp may be set on the hole of the installation board 1151. In some embodiments, the installation board 1151 and the support pillar 1152 may be made of quartz.

The catalytic ozone oxidation reactor 120 may be configured for second-stage gas purification treatment. In some embodiments, the shape of the catalytic ozone oxidation reactor 120 may include a hollow cylinder, a hollow oval cylinder, a hollow polygon prism, a hollow spherical, or other shapes. This present disclosure is not limited to this. In some embodiments, the catalytic ozone oxidation reactor 120 has a reaction cavity 121, and the reaction cavity 121 is configured to provide a reaction place for the second-stage gas purification treatment. In some embodiments, the shape of the reaction cavity 121 may include a hollow cylinder, a hollow oval cylinder, a hollow polygon prism, a hollow spherical, or other shapes. This present disclosure is not limited to this. As shown, the reaction cavity 121 be disposed with the light oxidation reactor 110 and the light catalytic reactor 130 in the hollow shape of the reaction cavity 121. The size of the reaction cavity 121 may be disposed according to actual needs (for example, the flow amount or flow rate of the gas to be treated), and this present disclosure is not limited to this. For example, the volume of the reaction cavity 121 may be $0.1 \text{ m}^3$. For another example, when the shape of the reaction cavity 121 is a hollow cylindrical shape, the difference between the outer diameter and the inner diameter of the reaction cavity 121 is 10 mm and the height of the reaction cavity 121 is 400 mm.

In some embodiments, the shape of the catalytic ozone oxidation reactor 120 may include a cylinder, an oval cylinder, a polygon prism, a spherical, or other shapes. In some embodiments, the shape of the reaction cavity 121 may include a cylinder, an oval-shaped, a polygon prism, a spherical, or other shapes. The catalytic ozone oxidation reactor 120 is separated with the light oxidation reactor 110 and the light catalytic reactor 130 are separated.

In some embodiments, the reaction cavity 121 may include at least one inlet pipe and at least one outlet pipe. At least one inlet pipe and at least one outlet pipe may be disposed according to actual needs, and this present disclosure is not limited to this. In some embodiments, the upper end of the reaction cavity 121 is disposed with at least one inlet pipe 122 and the lower end of the reaction cavity 121 is disposed with at least one outlet 123. In some embodiments, the lower end and upper end of the reaction cavity 121 are disposed with at least one rotary connection, the lower end and upper end of the reaction cavity 121 are connected to at least one inlet pipe 122 and at least one outlet pipe 123 through the rotary connection. In some embodiments, the material of the inlet pipe 122 and/or the outlet pipe 123 may be polytrafluorolythe, polyvinyl chloride, stainless steel, carbon steel, or alloy. In some embodiments, the cross-section of the inlet pipe 122 and/or the outlet pipe 123 may be a round, a square or other polygons, and this present disclosure is not limited to this. The size of the inlet pipe 122 and/or the outlet pipe 123 may be disposed according to the need (for example, the flow rate of the gas to be treated), and this present disclosure is not limited to this. For example, the inlet pipe 122 and/or outlet pipe 123 may be a circular pipe with a diameter of 3 mm. In some embodiments, the inlet pipe 122 may be connected to the outlet pipe 113 to make the catalytic ozone oxidation 120 in fluid communication with the light oxidation reactor 110. In some embodiments, the inlet pipe 122 and the outlet pipe 113 may be a same pipe. Two ends of the pipeline are connected with the catalytic ozone oxidation reactor 120 and the light oxidation reactor 110, respectively.

In some embodiments, an ozone oxidation catalyst is filled in the reaction cavity 121. In some embodiments, the ozone oxidation catalyst may be selected from at least one of a transition metal oxide and a composite catalyst of a transition metal oxides and a molecular sieve. In some embodiments, the transition metal oxide may be at least one of the oxides of transition metals such as Mn, Fe, Co, Ni, V, Cu, Ce, Ag. Preferably, the ozone oxidation catalyst may be at least one of a $MnO_2$ and a composite catalyst of $MnO_2$/molecular sieve. More preferably, the ozone oxidation catalyst may be a composite catalyst of $\delta$-$MnO_2$/molecular sieve. For example, the ozone oxidation catalyst may be a composite catalyst of $\delta$-$MnO_2$/USY molecular sieve.

Through at least one inlet pipe 122, the gas after the first-stage purification treatment may be introduced into the catalytic ozone oxidation reactor 120, and a second-stage purification treatment may be performed under the action of the ozone oxidation catalyst; the gas after the second-stage purification treatment is discharged from the catalytic ozonation reactor 120 through the outlet pipe 123, and the gas is introduced to other equipment (e.g., the light catalytic reactor 130), or directly discharged into the environment where the gas purification treatment device 100 is located.

The light catalytic reactor 130 may be configured for a third-stage gas purification treatment. In some embodiments, the shape of the light catalytic reactor 130 may include a hollow cylinder, a hollow oval cylinder, a hollow polygon prism, a hollow spherical, or other shapes. This present disclosure is not limited to this. In some embodiments, the light catalytic reactor 130 has a reaction cavity 131, and the reaction cavity 131 is configured to provide a reaction place for the third-stage gas purification treatment. In some embodiments, the shape of the reaction cavity 131 may include a medium-empty column, a hollow cylinder, a hollow oval cylinder, a hollow polygon prism, a hollow spherical, or other shapes. This present disclosure is not limited to this. The light oxidation reactor 110 is disposed in the hollow shape of the reaction cavity 131. The size of the reaction cavity 131 may be disposed according to actual needs (for example, the flow amount or flow rate of the gas to be treated), and this present disclosure is not limited to this. For example, the reaction cavity 131 is a hollow cylinder, and the difference between the outer diameter and the inner diameter may include 10-400 mm. More preferably, the difference between the outer diameter and the inner diameter of the reaction cavity 131 may include 20-350 mm. More preferably, the difference between the outer diameter and the inner diameter of the reaction cavity 131 may include 30-300 mm. More preferably, the difference between the outer diameter and the inner diameter of the reaction cavity 131 may include 40-250 mm. More preferably, the difference between the outer diameter and the inner diameter of the reaction cavity 131 may include 50-200 mm. More preferably, the difference between the outer diameter and the inner diameter of the reaction cavity 131 may include 60-150 mm. More preferably, the difference between the outer diameter and the inner diameter of the reaction cavity 131 may include 70-130 mm. More preferably, the difference between the outer diameter and the inner diameter of the reaction cavity 131 may include 80-100 mm.

In some embodiments, as shown in FIG. 1, the light catalytic reactor 130 may also surround the light oxidation reactor 110, that is, the light oxidation reactor 110 is disposed in the hollow cavity of the light catalytic reactor 130. In some embodiments, the light catalytic reactor 130 is separated from the light oxidation reactor 110 through a light transmittance component, so that the second light may pass through the reaction cavity 131 of the light transmittance component into the light catalytic reactor 130. In some embodiments, the light catalytic reactor 130 may be adjacent to the light oxidation reactor 110. For example, both the light oxidation reactor 110 and the light catalytic reactor 130 are quadrangular prisms, the light catalytic reactor 130 is arranged on the left and/or right of the light oxidation reactor 110, and the two are arranged side by side, and the light catalytic reactor 130 and the adjacent walls of the light oxidation reactor 110 are configured as the light transmittance component, so that the second light may pass through the light transmittance component and enter the reaction cavity 131 of the light catalytic reactor 130.

In some embodiments, a photocatalyst is filled in the reaction cavity 131. The component of the photocatalyst may be related to the type of the second light.

In some embodiments, the second light is ultraviolet light. In some embodiments, the photocatalyst may include one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, a $Sn/S/F/TiO_2/SnO_2$ composite catalyst. One or more of the $TiO_2$ catalyst, the $TiO_2/SiO_2$ composite catalyst, the $F/TiO_2/SiO_2$ composite catalyst, the $Bi/F/TiO_2/SiO_2$ composite catalyst, the $S/F/TiO_2/SiO_2$ composite catalyst, the $S/Bi/F/TiO_2/SiO_2$ composite catalyst, the $Sn/S/F/TiO_2$ composite catalyst and the $Sn/S/F/TiO_2/SnO_2$ composite catalyst is filled in the reaction cavity 131. Under irradiation of the second light (the wavelength is less than or equal to 254 nm), a third-stage gas purification treatment is performed in the reaction cavity 131.

In some embodiments, the second light is ultraviolet light and visible light. In some embodiments, the photocatalyst may also include one or more of a $TiO_2$ catalyst, $TiO_2/SiO_2$ composite catalyst, and a $BiVO_4$ catalyst. In some embodiments, the $BiVO_4$ catalyst is filled in a side of the light catalytic reactor 130 away from the light oxidation reactor 110. One or more of the $TiO_2$ catalyst, the $TiO_2/SiO_2$ composite catalyst, the $F/TiO_2/SiO_2$ composite catalyst, the $Bi/F/TiO_2/SiO_2$, the $S/F/TiO_2/SiO_2$ composite catalyst, the $S/Bi/F/TiO_2/SiO_2$ composite catalyst, the $Sn/S/F/TiO_2$ composite catalyst, and the $Sn/S/F/TiO_2/SnO_2$ composite catalyst are filled in a side of the light catalytic reactor 130 close to the light oxidation reactor 110. Under irradiation of the second light (the wavelength is less than or equal to 254 nm), one or more of the $TiO_2$ catalyst, the $TiO_2/SiO_2$ composite catalyst, the $F/TiO_2/SiO_2$ composite catalyst, the $Bi/F/TiO_2/SiO_2$ composite catalyst, the $S/F/TiO_2/SiO_2$ composite catalyst, the $S/Bi/F/TiO_2/SiO_2$ composite catalyst, the $Sn/S/F/TiO_2$ composite catalyst, and the $Sn/S/F/TiO_2/SnO_2$ composite catalyst may utilize the ultraviolet light in the second light to perform a third-stage purification treatment on the gas. At the same time, the $BiVO_4$ catalyst may use the visible light in the second light to perform the third-stage purification treatment on the gas.

In some embodiments, the reaction cavity 131 may include at least one inlet pipe and at least one outlet pipe. At least one inlet pipe and at least one outlet pipe may be disposed according to actual needs, and the present disclosure is not limited to this. In some embodiments, the lower end of the reaction cavity 131 includes at least one inlet pipe 132 and the upper end of the reaction cavity 131 includes at least one outlet pipe 133. In some embodiments, the material of the inlet pipe 132 and/or the outlet pipe 133 may be polytrafluorolythe, polyvinyl chloride, carbon steel, or alloy. In some embodiments, the cross-section of the inlet pipe 132 and/or the outlet pipe 133 may be a round, a square or other polygons, and this present disclosure is not limited to this. The size of the inlet pipe 132 and/or the outlet pipe 133 may be disposed according to the need (for example, the flow rate of the gas to be treated), and this present disclosure is not limited to this. For example, the inlet pipe 132 and/or the outlet pipe 133 may be a circular pipe with a diameter of 3 mm. In some embodiments, the inlet pipe 132 may be connected to the outlet pipe 123 to make the light catalytic reactor 130 in fluid communication with the catalytic ozone oxidation reactor 120. In some embodiments, the inlet pipe 132 and the outlet pipe 123 may be a same pipe. Two ends of the pipeline are connected with the catalytic ozone oxidation reactor 120 and the light catalytic reactor 130, respectively. Through at least one inlet pipe 132, the gas of the second-stage purification treatment may be passed into the light catalytic reactor 130, and a third-stage purification treatment may be performed under irradiation of the second light the action of the photocatalyst. The gas after the third-stage purification treatment is discharged from the light catalytic reactor 130 through the outlet pipe 133 and passed into other equipment (e.g., the heating catalytic reactor 150 shown in FIG. 5) or directly discharged into the environment where the gas purification treatment device 100 is located.

The microwave transmitter 140 may be configured to excite the light source 114 to emit first light and second light. In some embodiments, the first light may be vacuum ultraviolet light. In some embodiments, the second light may be ultraviolet light, or ultraviolet light and visible light. In some embodiments, the microwave transmitter 140 may be connected to the light oxidation reactor through a microwave magnetic control tube 141 to excite the light source 114 to emit the first light and the second light.

In some embodiments, as shown in FIG. 1, the microwave transmitter 140 may also be connected to the light catalytic reactor 130 through the microwave magnetic control tube 141, and a microwave emitted by the microwave transmitter 140 may excite the light source 114 to emit the first light and the second light. At the same time, the microwave transmitter 140 may also emit microwaves to the light catalytic reactor 130 to enhance the activity of the photocatalyst.

In some embodiments, the microwave emitter 140 may also be omitted, and the ultraviolet lamp in the light oxidation reactor 110 may be a conventional ultraviolet lamp to provide ultraviolet light of the desired wavelength, for example, vacuum ultraviolet light with wavelength ≤185 nm and wavelength ≤254 nm ultraviolet light. The gas purification treatment using the purification treatment device of this structure is similar to the method for the gas purification treatment using the gas purification treatment device 100 shown in FIG. 1. For details, reference may be made to the description of FIG. 6, which is not repeated here.

In some embodiments, as shown in FIG. 3, the gas purification treatment device 100 may also include a heating catalytic reactor 150.

The heating catalytic reactor 150 may be configured for a fourth-stage gas purification treatment. In some embodiments, the external shape of the heating catalytic reactor 150 may include a hollow cylindrical shape, a hollow elliptical cylindrical shape, a hollow polygonal prism shape, a hollow spherical shape, or other shapes, which are not limited in this present disclosure. In some embodiments, the heating catalytic reactor 150 has a reaction cavity 151, and the reaction cavity 151 is configured to provide a reaction place for a fourth-stage gas purification treatment.

In some embodiments, the shape of the reaction cavity 151 may include a cylinder, an oval-shaped, a polygon prism, a spherical, or other shapes. This present disclosure is not limited to this. The shape of the reaction cavity 151 may be the same as or different from that of the heating catalytic reactor 150. For example, the shape of the heating catalytic reactor 150 is polygon prism, and the shape of the reaction cavity 151 may be polygon prism or cylindrical. The size of the reaction cavity 151 may be disposed according to actual needs (for example, the flow amount or flow rate of the gas to be treated), and this present disclosure is not limited to this. As shown in FIG. 3, the hollow inside of the reaction cavity 151 is disposed with the photochemical reactor 110 and the light catalytic reactor 130, and the heating catalytic reactor 150 is disposed in the reactor of the catalytic ozone oxidation reactor 120.

In some embodiments, the reaction cavity 151 may include at least one inlet pipe and at least one outlet pipe. At least one inlet pipe and at least one outlet pipe may be disposed according to actual needs, and this present disclosure is not limited to this. In some embodiments, the lower end of the reaction cavity 151 is provided with at least one inlet pipe 152 and the lower end of the reaction cavity is provided with at least one outlet pipe 153. In some embodiments, the material of the inlet pipe 152 and/or the outlet pipe 153 may be polytetrafluoroethylene, polyvinyl chloride, carbon steel, alloy, or the like. In some embodiments, the cross-section of the inlet pipe 152 and/or the outlet pipe 153 may be a circular, a square or other polygons, and this present disclosure is not limited to this. The size of the inlet pipe 152 and/or the outlet pipe 153 may be disposed according to the need (for example, the flow rate of the gas to be treated), and this present disclosure is not limited to this. For example, the inlet pipe 152 and/or the outlet pipe 153 may be a circular pipe with a diameter of 3 mm. In some embodiments, the inlet pipe 152 may be connected to the outlet pipe 133 to make the light catalytic reactor 130 in fluid communication with the heating catalytic reactor 150. In some embodiments, the inlet pipe 152 and the outlet pipe 133 may be a same pipe, and the two ends of the pipe are respectively connected with the heating catalytic reactor 150 and the light catalytic reactor 130. Through at least one inlet pipe 152, the gas after the third-stage purification treatment may be passed into the heating catalytic reactor 150 to perform a fourth-stage purification treatment; the gas after the fourth-stage purification treatment may be discharged from the heating catalytic reactor 110 through the outlet pipe 153, and the gas may be passed to other equipment (e.g., the catalytic ozone oxidation reactor 120) or directly discharged into the environment where the gas purification treatment device 100 is located.

In some embodiments, the reaction cavity 151 is filled with a thermal catalyst. In some embodiments, the thermal catalyst may be a Mn catalyst. Preferably, the thermal catalyst may be at least one of a MnO, a $MnO_2$ or other manganese oxides. More preferably, the thermal catalyst may be an $\alpha$-$MNO_2$ catalyst.

In some embodiments, the microwave transmitter 140 may emit microwaves to heat the heating catalytic reactor 150 to provide heat for the fourth-stage purification treatment. In the presence of the thermal catalyst and the heat provided by microwaves emitted by the microwave transmitter, in the heating catalytic reactor 150, the fourth-stage purification treatment is performed on the gas after the third-stage purification treatment. Specifically, as shown in FIG. 3, the microwave transmitter 140 may also be connected to the heating catalytic reactor 150 through the microwave transmitter 141, and the microwaves emitted by the microwave transmitter 140 may excite the light source 114 to emit first light and second light, meanwhile, microwaves may also be emitted to the light catalytic reactor 130 to enhance the activity of the photocatalyst, and microwaves may be emitted to the heating catalytic reactor 150 to heat the heating catalytic reactor 150.

In some embodiments, the gas purification treatment device 100 may include a plurality of gas purification treatment units in parallel, and each gas purification treatment unit is equivalent to an independent gas purification treatment device. By connecting a plurality of gas purification treatment units in series, the purification treatment capacity of the gas may be increased.

Figure 4:
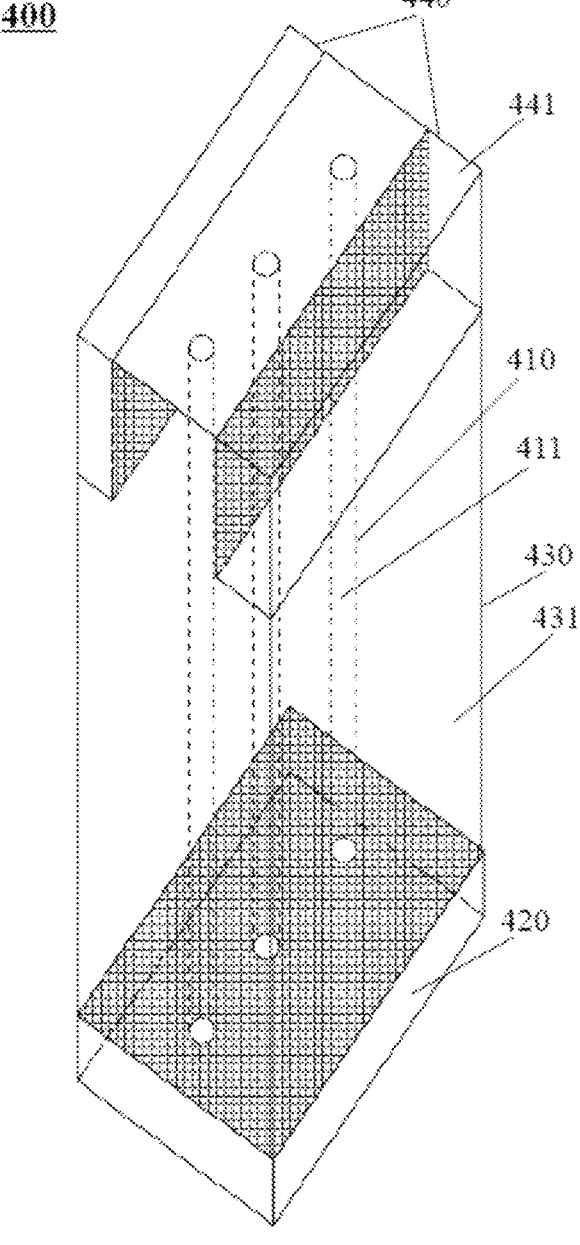
FIG. 4 is a schematic diagram illustrating an exemplary gas purification treatment device according to some embodiments of the present disclosure.
Figure 5:
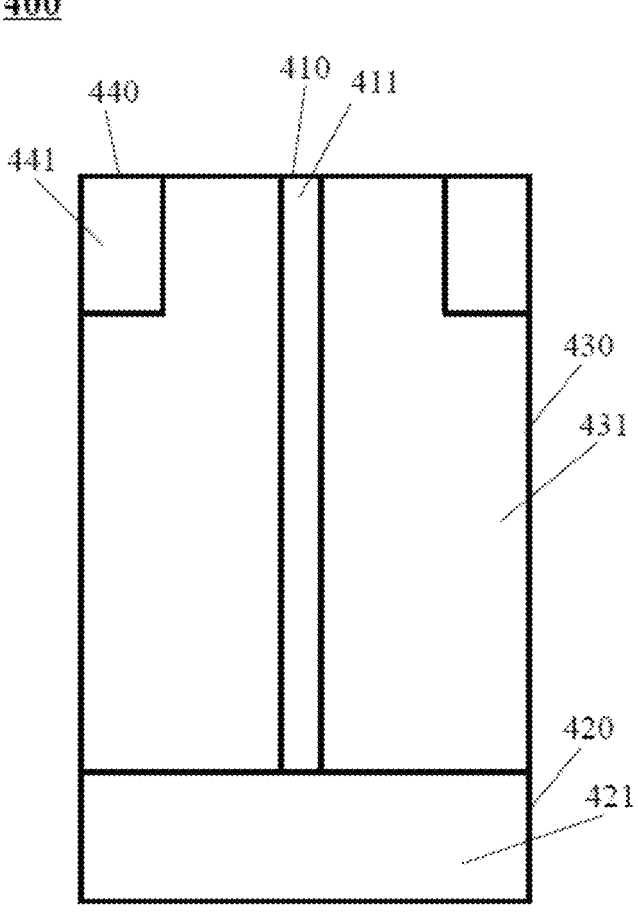
FIG. 5 is a flat view illustrating an exemplary gas purification treatment device according to some embodiments of the present disclosure.

FIG. 4 is a schematic diagram illustrating an exemplary gas purification treatment device according to some embodiments of the present disclosure; FIG. 5 is a flat view illustrating an exemplary gas purification treatment device according to some embodiments of the present disclosure.

The embodiment of the present disclosure provides a schematic diagram of another gas purification treatment device, and another gas purification treatment device 400 will be described in detail below with reference to FIG. 4 and FIG. 5. As shown in FIGS. 4 and 5, the gas purification treatment device 400 may include a light oxidation reactor 410, a catalytic ozone oxidation reactor 420, a photocatalytic reactor 430, a microwave emitter (not shown in FIG. 4), and a heating catalytic reaction device 440.

The light oxidation reactor 410 may be configured for a first-stage gas purification treatment. In some embodiments, the light oxidation reactor 410 may include multiple hollow cylinders or polygon prism. For example, as shown in FIG. 4, the light oxidation reactor 410 includes 3 hollow cylinders. In some embodiments, each hollow cylinder of the light oxidation reactor 410 includes a reaction cavity 411, and the reaction cavity 411 is configured to provide a reaction place for the first-stage gas purification treatment. As shown in FIG. 4, the light oxidation 410 includes three reaction cavities 411. The shape of the reaction cavity 411 may be the same as that of the light oxidation reactor 410, or may be different from that of the light oxidation reactor 410. For example, the shape of the light oxidation reactor 410 may be cylindrical, and the shape of the reaction cavity 411 may be cylindrical or polygon prism. In some embodiments, as shown in FIG. 4, the shape of the light oxidation reactor 410 is cylindrical, the shape of the reaction cavity 411 is cylindrical, and the inner diameter of the light oxidation reactor 410 (that is, the diameter of the reaction cavity 411) may include 10-120 mm. More preferably, the inner diameter of the light oxidation reactor 410 may include 20-110 mm. More preferably, the inner diameter of the light oxidation reactor 410 may include 30-100 mm. More preferably, the inner diameter of the light oxidation reactor 410 may include 40-90 mm. More preferably, the inner diameter of the light oxidation reactor 110 may include 50-80 mm. More preferably, the inner diameter of the light oxidation reactor 410 may include 60-70 mm. In some embodiments, the height of the light oxidation reactor 410 may be disposed according to actual needs (for example, the flow amount or the flow rate of the gas to be treated), and this present disclosure is not limited to this. For example, the height of the light oxidation reactor 410 is 1000 mm. For another example, the height of the light oxidation reactor 410 is 750 mm. For another example, the height of the light oxidation reactor 410 is 500 mm. For another example, the height of the light oxidation reactor 410 is 350 mm.

In some embodiments, the reaction cavity 411 may include at least one inlet and at least one outlet. At least one inlet and at least one outlet may be disposed according to actual needs, and this present disclosure is not limited to this. In some embodiments, the upper end of the reaction cavity 411 is disposed at least one inlet and the lower end of the reaction cavity 411 is disposed at least one outlet. In some embodiments, the cross-section of the inlet and/or the outlet may be a round, a square or other polygons, and this present disclosure is not limited to this. The size of the inlet and/or the outlet may be disposed according to the need (for example, the flow rate of the gas to be treated), and this present disclosure is not limited to this. For example, the inlet and/or the outlet may be a circular port with a diameter of 3 mm. Through at least one inlet, the gas to be purified may be passed into the light oxidation reactor 410 to perform a first-stage purification treatment; the gas after the first-stage purification treatment may be discharged from the light oxidation reactor 410 through the outlet, and the gas may be passed to other equipment (e.g., the catalytic ozone oxidation reactor 120) or directly discharged into the environment where the gas purification treatment device 400 is located.

In some embodiments, a light source (not shown in FIG. 4 and FIG. 5) is disposed in the reaction cavity 411, and the light source may emit first light and second light. In some embodiments, the first light may be vacuum ultraviolet light, and the second light may be ultraviolet light. In some embodiments, the first light may be vacuum ultraviolet light, and the second light may be ultraviolet light and visible light. The light oxidation reactor 410 may perform first-stage gas purification treatment under irradiation of the first light. A side wall of the light oxidation reactor 410 is made of light transmittance material, so that the second light may penetrate the side wall of the light oxidation reactor 410 and illuminate the outside of the light oxidation reactor 410. For more information about the light transmittance material, please refer to the relevant descriptions in FIGS. 1-3.

In some embodiments, the light source may include an ultraviolet lamp to provide a vacuum ultraviolet light, an ultraviolet light, and a visible light. In some embodiments, the ultraviolet lamp may be a microwave non-pole ultraviolet lamp. The microwave non-pole may excite the microwave transmitter to emit the first light and the second light. The shape, size, and count of ultraviolet lamps may be determined according to actual needs (for example, the parameters of the gas and the height of the reaction cavity 411). For example, the ultraviolet lamp may be three microwave non-pole ultraviolet lamps, which are respectively installed in three reaction cavities 411. In some embodiments, the parameter of the gas to be treated may be the concentration of impurities or biological pollutants in the gas or the flow rate of the gas.

For more details about the light oxidation reactor 410, reference may be made to the description of the light oxidation reactor 110 in FIGS. 1-3, which will not be repeated here.

The catalytic ozone oxidation reactor 420 may be configured to perform a second-stage purification treatment on the gas. In some embodiments, as shown in FIG. 4, the catalytic ozone oxidation reactor 420 is cube. The top of the catalytic ozone oxidation reactor 420 is provided with a metal mesh, through which the catalytic ozone oxidation reactor 420 is separated from the photocatalytic reactor 430. In some embodiments, the material of the metal mesh may include stainless steel, carbon steel, alloy, etc. In some embodiments, the metal mesh is provided with three holes for connecting with the outlet of the light oxidation reactor 410, so that a first mixed gas after the first-stage purification treatment flows into the catalytic ozone oxidation reactor 420. The positions and sizes of the three holes in the metal mesh respectively correspond to the positions and sizes of the three hollow cylinders of the light oxidation reactor 410. In some embodiments, the three hollow cylinders of the light oxidation reactor 410 may be disposed to protrude into the bottom of the catalytic ozone oxidation reactor 420, so that the first-mixed gas flows into the catalytic ozone oxidation reactor 420 sufficiently.

In some embodiments, the catalytic ozone oxidation reactor 420 has a reaction cavity 421, and the reaction cavity 421 is configured to provide a reaction place for performing a second-stage gas purification treatment. In some embodiments, the shape of the reaction cavity 421 is cube. The size of the reaction cavity 421 may be disposed according to actual needs (for example, the flow amount or flow rate of the gas to be treated), and this present disclosure is not limited to this. For example, the volume of the reaction cavity 421 may be 0.1 m$^3$.

In some embodiments, an ozone oxidation catalyst is filled in the reaction cavity 421. For more details about the ozone oxidation catalyst, reference may be made to the descriptions of FIGS. 1-3, which will not be repeated here. By connecting the outlet of the light oxidation reactor 410 with the catalytic ozone oxidation reactor 420, the gas that has undergone the first-stage purification treatment may be passed into the catalytic ozone oxidation reactor 420, and a second-stage purification treatment may be performed under the action of the ozone oxidation catalyst. The gas after the second-stage purification treatment is discharged from the catalytic ozone oxidation reactor 420 through the gaps in the metal mesh and enters the photocatalytic reactor 430.

For more contents about the catalytic ozone oxidation reactor 420, reference may be made to the description of the catalytic ozone oxidation reactor 120 in FIGS. 1-3, which will not be repeated here.

The photocatalytic reactor 430 may be configured for a third-stage gas purification treatment. In some embodiments, the photocatalytic reactor 430 may be a cube or irregular cube. For example, as shown in FIG. 4, the photocatalytic reactor 430 is an irregular cube include two upper and lower cubes with different sizes. A metal mesh is disposed on the surface of the top small cube of the photocatalytic reactor 430. The photocatalytic reactor 430 is separated from the heating catalytic reactor 440 by the metal mesh. For more details about the metal mesh, reference may be made to the foregoing description, which will not be repeated here.

In some embodiments, the photocatalytic reactor 430 has a reaction cavity 431, and the reaction cavity 431 is configured to provide a reaction place for a third-stage gas purification treatment. In some embodiments, the shape of the reaction cavity 431 may be a cube or an irregular cube. The size of the reaction cavity 431 may be disposed according to actual needs (for example, the flow amount or flow rate of the gas to be treated), and this present disclosure is not limited to this.

In some embodiments, as shown in FIG. 4, the light oxidation reactor 410 is disposed in the hollow reaction cavity 431 of the photocatalytic reactor 430. In some embodiments, the photocatalytic reactor 430 is separated from the light oxidation reactor 410 by a light transmittance sidewall of the light oxidation reactor 410, so that the second light may enter the reaction cavity 431 of the photocatalytic reactor 430 through the light transmittance sidewall.

In some embodiments, a photocatalyst is filled in the reaction cavity 431. The component of the photocatalyst may be related to the type of the second light.

In some embodiments, the second light is ultraviolet light. In some embodiments, the photocatalyst may include one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, and a $Sn/S/F/TiO_2/SnO_2$ composite catalyst. One or more of the $TiO_2$ catalyst, the $TiO_2/SiO_2$ composite catalyst, the $F/TiO_2/SiO_2$ composite catalyst, the $Bi/F/TiO_2/SiO_2$ composite catalyst, the $S/F/TiO_2/SiO_2$ composite catalyst, the $S/Bi/F/TiO_2/SiO_2$ composite catalyst, the $Sn/S/F/TiO_2/SnO_2$ composite catalyst is filled in the reaction cavity 431, under irradiation of the second light (the wavelength is less than or equal to 254 nm), the third-stage gas purification treatment is performed in the reaction cavity 431.

In some embodiments, the second light is ultraviolet light and visible light. In some embodiments, the photocatalyst may also include one or two of the $TiO_2$ catalyst and the $TiO_2/SiO_2$ composite catalyst, and the $BiVO_4$ catalyst. In some embodiments, the $BiVO_4$ catalyst is filled in a side of the light oxidation reactor 410 in the photocatalytic reactor 430, and one or more of the $TiO_2$ catalyst, the $TiO_2/SiO_2$ composite catalyst, the $F/TiO_2/SiO_2$ composite catalyst, the $Bi/F/TiO_2/SiO_2$ Composite catalyst, the $S/F/TiO_2/SiO_2$ composite catalyst, the $S/Bi/F/TiO_2/SiO_2$ composite catalyst, the $Sn/S/F/TiO_2$ composite catalyst, the $Sn/S/F/TiO_2/SnO_2$ composite catalyst is filled in the photocatalytic reactor 430 close to the side of the light oxidation reactor 110. Under irradiation of the second light (ultraviolet light and visible light with a wavelength less than or equal to 254 nm), and one or more of the $TiO_2$ catalyst, the $TiO_2/SiO_2$ composite catalyst, the $F/TiO_2/SiO_2$ composite catalyst, the $Bi/F/TiO_2/SiO_2$ composite catalysts, the $S/F/TiO_2/SiO_2$ composite catalyst, the $S/Bi/F/TiO_2/SiO_2$ composite catalyst, the $Sn/S/F/TiO_2$ composite catalyst, and the $Sn/S/F/TiO_2/SnO_2$ composite catalyst may use the ultraviolet light in the second light to perform the third-stage gas purification treatment. At the same time, the $BiVO_4$ catalyst may use the visible light in the second light to perform the third-stage gas purification treatment.

The photocatalytic reactor 430 is separated from the catalytic ozone oxidation reactor 420 and the heating catalytic reactor 440 by a metal mesh, and the gas that has undergone the second-stage purification treatment may be passed into the photocatalytic reactor 430. The third-stage purification treatment is performed under the action of the photocatalyst and irradiation of the second light; the gas after the third-stage purification treatment is discharged from the photocatalytic reactor 430 through the gaps in the metal mesh, and enters the heating catalytic reactor 440.

For more details about the photocatalytic reactor 430, reference may be made to the description of the light catalytic reactor 130 in FIGS. 1-3, which will not be repeated here.

The heating catalytic reactor 440 may be configured for a fourth-stage gas purification treatment. In some embodiments, the shape of the heating catalyst 440 may be a cube. For example, as shown in FIG. 4, the heating catalytic reactor 440 is two cubes distributed on both sides of the photocatalytic reactor 430. In some embodiments, each cube of the heating catalytic reactor 440 includes a reaction cavity 441, and the reaction cavity 441 is configured to provide a reaction place to perform a fourth-stage gas purification treatment. As shown in FIG. 4, the heating catalytic reactor 440 includes two reaction cavities 441.

In some embodiments, the shape of the reaction cavity 441 is cube. The shape of the reactor 441 is the same as that of the heating catalytic reactor 440. The size of the reaction cavity 441 may be disposed according to actual needs (for example, the flow amount or flow rate of the gas to be treated), and this present disclosure is not limited to this. The shape of the reaction cavity 411 may be the same as that of the heating catalytic reactor 440, or may be different from that of the heating catalytic reactor 440. For example, the shape of the heating catalytic reactor 440 may be a cube, and the shape of the reactive cavity 411 may be a cube or a sphere.

In some embodiments, a thermal catalyst is filled in the reaction cavity 441. In some embodiments, the thermal catalysts may be a Mn catalyst. Preferably, the thermal catalyst may be at least one of a MnO, a $MnO_2$ or other manganese oxides. More preferably, the thermal catalyst may be a $MnO_2$ catalyst. Regarding the preparation of the catalyst, reference may be made to the foregoing content, which will not be repeated here.

In some embodiments, the reaction cavity 441 may include at least one outlet. At least one outlet may be disposed according to actual needs, and this present disclosure is not limited to this. In some embodiments, the upper end of the reaction cavity 441 is disposed with at least one outlet (not shown in FIG. 4). In some embodiments, the cross-section of the outlet may be a round, a square or other polygons, and this present disclosure is not limited to this. The size of the outlet may be disposed according to the need (for example, the flow rate of the gas to be treated), and this present disclosure is not limited to this. For example, the outlet may be a circular tube with a diameter of 3 mm.

The photocatalytic reactor 430 is separated from the heating catalytic reactor 440 by a metal mesh, and the gas subjected to the third-stage purification treatment may be passed into the heating catalytic reactor 440 for the fourth-stage purification treatment; the gas after the fourth-stage purification treatment may be discharged from the heating catalytic reactor 440 through the outlet, and the gas may be passed to other equipment (e.g., a purge gas storage tank) or directly discharged into the environment where the gas purification treatment device 400 is located.

For more information about the heating catalytic reactor 440, reference may be made to the description of the heating catalytic reactor 150 in FIGS. 1-3, which will not be repeated here.

A microwave transmitter may be configured to excite first light and second light of a light source. In some embodiments, the first light may be vacuum ultraviolet light. In some embodiments, the second light may be ultraviolet light or ultraviolet light and visible light. In some embodiments, the microwave emitter may be connected to an outer wall of the light oxidation reactor 410 through a pipe to excite the light source to emit the first light and the second light.

In some embodiments, the microwave transmitter may also be connected to an outer wall of the photocatalytic reactor 430 through a pipe, so as to emit microwaves to the photocatalytic reactor 430 to enhance the activity of the photocatalyst. At the same time, microwaves may enter the light oxidation reactor 410 through the photocatalytic reactor 430 to excite the emitting of the first light and the second light.

In some embodiments, the microwave transmitter 140 may also be omitted, and an ultraviolet lamp in the light oxidation reactor 110 adopts a conventional ultraviolet lamp to provide ultraviolet light of a desired wavelength, for example, a vacuum ultraviolet light with wavelength ≤185 nm and an ultraviolet light with wavelength ≤254 nm.

For more information about the microwave transmitter, reference may be made to the description about the microwave transmitter 140 in FIGS. 1-3, which will not be repeated here.

In some embodiments, the gas purification treatment device 400 may include multiple gas purification treatment units in parallel, and each gas purification treatment unit is equivalent to an independent gas purification treatment device. By connecting a plurality of gas purification treatment units in series, the purification treatment capacity of the gas may be increased.

FIG. 6 is a flowchart illustrating an exemplary gas purification treatment method according to some embodiments of the present disclosure. The method may be performed by one or more components of the gas purification treatment device 100 or the gas purification treatment device 400. In some embodiments, a process 600 may be performed automatically by a control system. For example, the process 600 may be implemented by control instructions, and the control system controls various components to perform various operations of the process 600 based on the control instructions. In some embodiments, the process 600 may be performed semi-automatically. For example, one or more operations of the process 600 may be performed manually by an operator. In some embodiments, in performing the process 600, one or more additional operations not described above may be added, and/or one or more operations discussed herein may be omitted. Additionally, the order of operations shown in FIG. 6 is not limited.

In 610, a gas is introduced into a light oxidation reactor, and a first-stage purification treatment is performed under irradiation of a first light to obtain a first mixed gas.

The gas is a gas to be treated. In some embodiments, the gas may include volatile organic compounds (VOCs) gas. The VOCs gas may include Non-Methane Hydrocarbons (NMHC), oxygen-containing organic compounds, halogenic hydrocarbons, nitrogen-containing organic compounds, sulfur-containing organic compounds, etc., for example, tither, benzenedehyde, formaldehyde, ethylbenzene, vicrofitnezylene, neighboring vicrone, benzonic acid, and glmetal. In some embodiments, the gas may include biological pollutants. In some embodiments, the biological pollutants may include one or more of bacteria, yeast, viruses, molds, and dust mites. In some embodiments, the gas may include the VOCs gas and the biological pollutants. It may be understood that the process 600 described in the embodiments of this present disclosure may purify the VOCs gas, and may also purify one or more of the bacteria, the yeast, the viruses, the molds, and dust mites. It may also purify the VOCs gas and one or more of the bacteria, the yeast, the viruses, the molds, and dust mites at the same time.

In some embodiments, the flow amount and flow rate of the light oxidation reactor (e.g., the light oxidation reactor 110) may be disposed according to actual needs (for example, mineralization rate of the VOCs gas, volume of the reaction cavity of the light oxidation reactor or the gas treatment capacity, etc.), and this present disclosure is not limited to this. In some embodiments, the flow amount or flow rate of the gas may be disposed according to the volume space velocity. The volume space velocity is the ratio of the gas volumetric flow rate to the catalyst volume per unit time. In some embodiments, the catalyst volume may be the volume of the ozone oxidation catalyst. In some embodiments, the volume space velocity may include $100\text{-}10000H^{-1}$. Preferably, the volume space velocity may include $500\text{-}9500H^{-1}$. Preferably, the volume space velocity may include $1000\text{-}9000H^{-1}$. Preferably, the volume space velocity may include $1500\text{-}8500H^{-1}$. Preferably, the volume space velocity may include $2000\text{-}8000H^{-1}$. Preferably, the volume space velocity may include $2500\text{-}7500H^{-1}$. Preferably, the volume space velocity may include $3000\text{-}7000H^{-1}$. Preferably, the volume space velocity may include $3500\text{-}6500H^{-1}$. Preferably, the volume space velocity may include $4000\text{-}6000H^{-1}$. Preferably, the volume space velocity may include $4500\text{-}5500H^{-1}$. Preferably, the volume space velocity may include $4800\text{-}5300H^{-1}$. Preferably, the volume space velocity may include $5000\text{-}5100H^{-1}$.

In some embodiments, the first light is vacuum ultraviolet (UV) light, for example, a 185 nm vacuum ultraviolet light. In some embodiments, the second light is ultraviolet light, for example, a 254 nm UV light. In some embodiments, the second light is ultraviolet light (for example, a 254 nm ultraviolet light) and visible light. The first light and the second light may be emitted from a same light source (e.g., a light source 114). In some embodiments, the light source emits the first light and the second light excited by microwaves. Specifically, the microwave transmitter 140 may be activated to emit microwaves to excite the light source 114 to emit a mixed light mainly composed of a 185 nm vacuum ultraviolet light and a 254 nm ultraviolet light and visible light.

In some embodiments, the first mixed gas may include carbon dioxide, carbon monoxide, water, benzoic acid, acetic acid, formic acid, benzaldehyde, benzene, phenol, 2-methylphenol, heptanal, and the like.

In some embodiments, under the action of the first light, the first-stage purification treatment includes photolysis and light oxidation of the gas to obtain the first mixed gas. Specifically, taking the gas purification treatment device 100 shown in FIG. 1 as an example, the gas to be treated including VOCs and/or biological pollutants may be passed into the reaction cavity 111 in the light oxidation reactor 110 through the inlet pipe 112. In some embodiments, under the action of the first light, $O_2$ in the gas to be treated generates strong oxidized free radicals and ozone ($O_3$); at the same time, other components in the gas to be treated (for example, VOCs gas, bacteria, yeast, viruses, molds, dust mites, etc.) are subjected to photolysis and light oxidation under the action of vacuum ultraviolet light with a wavelength of 185 nm, and are converted into small molecular organics such as aldehydes, ketones, acids or esters, or directly mineralized into inorganics such as $CO_2$ and $H_2O$ by chain scission or ring opening; after $H_2O$ and $O_2$ in the gas to be treated are irradiated with vacuum ultraviolet light with a wavelength of 185 nm, $H_2O$ and $O_2$ will generate strong oxidized free radicals, such as $\cdot OH$ and $\cdot O_2$, which may decompose the cell membrane of microorganisms and cause some bacteria, yeast, and viruses, molds, dust mites die directly, and finally get a first mixed gas including ozone.

In some embodiments, the first mixed gas obtained by the first-stage purification treatment may be discharged from a reaction cavity (e.g., the reaction cavity 111) of the light oxidation reactor through an outlet pipe (e.g., the outlet pipe 113).

In 620, the first mixed gas is passed into a catalytic ozone oxidation reactor filled with an ozone oxidation catalyst to perform a second-stage purification treatment to obtain a second mixed gas.

In some embodiments, the ozone oxidation catalyst may include at least one of the ozone oxidation catalyst selected from a composite catalyst of transition metal oxide, a transition metal oxide, and a molecular sieve. In some embodiments, the transition metal oxide may be at least one of oxides of transition metals such as Mn, Fe, Co, Ni, V, Cu, Ce, Ag and the like. Preferably, the ozone oxidation catalyst may be at least one of a $MnO_2$ and a composite catalyst of $MnO_2$/molecular sieve. More preferably, the ozone oxidation catalyst may be a composite catalyst of $\delta$-MnO2/ molecular sieve. For example, the ozone oxidation catalyst may be a composite catalyst of $\delta$-$MnO_2$/USY molecular sieve.

In some embodiments, the composite catalyst of $\delta$-$MnO_2$/ USY molecular sieve may be prepared by the following steps: placing 0.3 g KMnO4 and 1.7 g USY molecular sieve into a beaker ① of 250 mL, adding 40 mL deionized water, and magnetically stirring for 30 min; then weighing 0.055 g MnSO4·$H_2O$ into a beaker of 100 mL, adding 40 mL of deionized water to dissolve, slowly pouring it into the beaker ①, and magnetically stirring for 30 min, then transferring the solution to a Teflon reactor of 100 mL, and performing hydrothermal reaction at 150~170° C. for 24 h; after the reaction is completed, it is cooled to room temperature, after suction filtration, washing, drying at 80° C. for 2 hours, grinding and sieving, the solid particles of 40-60 meshes are obtained, which is the composite catalyst of $\delta$-$MnO_2$/USY molecular sieve.

In some embodiments, the second mixed gas may include carbon dioxide, carbon monoxide, water, benzaldehyde, benzene, benzoic acid, heptanal, benzyl alcohol, hexanol, hexanal, phenol, and the like.

In some embodiments, the second-stage purification treatment includes performing an ozone catalytic oxidation reaction on the first-mixed gas under the action of an ozone oxidation catalyst to obtain a second-mixed gas. Specifically, taking the gas purification treatment device 100 shown in FIG. 1 as an example, the first mixed gas is introduced into the reaction cavity 121 in the catalytic ozone oxidation reactor 120 filled with the ozone oxidation catalyst through the inlet pipe 122. Ozone in the first-mixed gas is decomposed to generate oxygen in the presence of a composite catalyst of $\delta$-$MnO_2$/USY molecular sieve. During this process, new ecological oxygen atoms will be generated, which have strong oxidized properties. In addition, in the presence of water vapor, active free radicals such as ·OH are also generated. In some embodiments, new ecological oxygen atoms, and ·OH and other active free radicals with bacteria, yeasts, viruses, mold, dust mites, etc. in the first mixed gas reaction, first occur with its external lipid double bonds. The oxidation reaction, the oxidation of its important material fat polysaccharides and protein, which changes the transmission of the biological wall, leading to the logistics, degeneration, and death of the key content inside the bacteria. Then, after the ozone enters the microorganism, it may continue to oxidatively react with the living substances such as DNA, RNA, enzymes, proteins, etc., resulting in irreversible damage, and eventually leading to partial death of bacteria, yeast, viruses, molds, dust mites, etc. in the first-mixed gas. In some embodiments, new ecological oxygen atoms, and ·OH and other active free radicals and first-level hybrid gases of the first level of purification processing are not decomposed, as well as disconnecting chain or opening or transformed into aldehyde, ketones, acid or ester, etc. Small molecules are further reacted. Broken chains or open-loops lead to smaller small molecules organic matter, or are directly mineralized into inorganic objects such as $CO_2$ and $H_2O$. The first mixed gas is purified by the second-stage purification treatment to finally obtain a second mixed gas.

In some embodiments, the second mixed gas obtained by the second-stage purification treatment may be discharged from the reaction cavity (e.g., the reaction cavity 121) of the catalytic ozone oxidation reactor through the outlet pipe (e.g., the outlet pipe 123).

In 630, the second mixed gas is passed into a photocatalytic reactor filled with a photocatalyst, and a third-stage purification treatment is performed under irradiation of the second light to obtain a purified gas.

The purified gas may be the components in the VOCs gas and/or the components of biological pollutants which are lower than the first threshold value or the mineralization rate is higher than the second threshold value. The first threshold is the maximum value at which the composition of the gas reaches the treatment requirements. The second threshold is the minimum value at which the composition of the gas reaches the treatment requirements. For example, the second threshold is a mineralization rate of toluene in the VOCs gas. In some embodiments, the mineralization rate of toluene in the VOCs gas may be above 92%.

The reaction cavity of the photocatalytic reactor is filled with a photocatalyst, and the composition of the photocatalyst may be related to the type of the second light.

In some embodiments, the second light is ultraviolet light (for example, 254 nm ultraviolet light). In some embodiments, the photocatalyst may include one or more of a $TiO_2$ catalyst, a $TiO_2$/$SiO_2$ composite catalyst, a F/$TiO_2$/$SiO_2$ composite catalyst, a Bi/F/$TiO_2$/$SiO_2$ composite catalyst, a S/F/$TiO_2$/$SiO_2$ composite catalyst, a S/Bi/F/$TiO_2$/$SiO_2$ composite catalyst, a Sn/S/F/$TiO_2$ composite catalyst, and a Sn/S/F/$TiO_2$/$SnO_2$ composite catalyst. One or more of the $TiO_2$ catalyst, the $TiO_2$/$SiO_2$ composite catalyst, the F/$TiO_2$/ $SiO_2$ composite catalyst, the Bi/F/$TiO_2$/$SiO_2$ composite catalyst, the S/F/$TiO_2$/$SiO_2$ composite catalyst, the S/Bi/F/$TiO_2$/ $SiO_2$ composite catalyst, the Sn/S/F/$TiO_2$ composite catalyst, and the Sn/S/F/$TiO_2$/$SnO_2$ composite catalyst are filled in the reactor (e.g., reaction cavity 131) of the photocatalytic reactor. In some embodiments, the $TiO_2$/$SiO_2$ composite catalyst may be prepared by the following steps: weighing 25 g of silica sol into a beaker of 250 mL, weighing 3 mL of KH-570 into the beaker, and stirring for 10 min; weighing 0.2 g of sodium hexametaphosphate into the beaker, stirring for 5 min, and adjusting the PH to 2; weighing 10 g of photocatalyst P25$TiO_2$ into a beaker, stirring magnetically for 1 h, drying at 80° C. for 12 h, grinding and sieving to obtain 40-60 mesh solid particles, which are the $TiO_2$/$SiO_2$ composite catalysts.

In some embodiments, the second light is ultraviolet light (for example, 254 nm ultraviolet light) and visible light. In some embodiments, the photocatalyst may also include one or two of a $TiO_2$ catalyst and a $TiO_2$/$SiO_2$ composite catalyst, and a $BiVO_4$ catalyst. In some embodiments, the $BiVO_4$ catalyst is filled in a side of the light oxidation reactor 130 away from the light oxidation reactor 110, and one or more of the $TiO_2$ catalyst, the $TiO_2$/$SiO_2$ composite catalyst, the F/$TiO_2$/$SiO_2$ composite catalyst, the Bi/F/$TiO_2$/$SiO_2$ Composite catalyst, the S/F/$TiO_2$/$SiO_2$ composite catalyst, the S/Bi/F/$TiO_2$/$SiO_2$ composite catalyst, the Sn/S/F/$TiO_2$ composite catalyst, the Sn/S/F/$TiO_2$/$SnO_2$ composite catalyst is filled in a side of the light catalytic reactor 130 close to the light oxidation reactor 110. In some embodiments, the $BiVO_4$ catalyst may be prepared by the following steps: dissolving 5 mmol $Bi(NO3)_3 \cdot 5H_2O$ into 25 mL 4 M $HNO_3$ solution, stirring at room temperature for 60 min; then dissolving the 5 mmol $NH4VO_3$ to the 25 ml 4 M NaOH solution, adding the hybrid solution to the Bl $(NO_3)_3$ solution, stirring 1 h and adding it to the high temperature and high pressure reactor, heating at 190° C. for 12 h; washing it 3-5 times with exfoliating water, and then centrifuging to remove impurities, the yellow precipitation obtained is the $BIVO_4$; after drying at 100° C. for 6 h, $BiVO_4$ powder may be obtained, which is the $BiVO_4$ catalyst.

In some embodiments, under the action of the photocatalyst, under the condition that the microwave emitted by the microwave transmitter provides heat, and under the irradiation of the second light, the third-stage purification process performs a photocatalytic reaction on the second gas mixture to obtain a purified gas. Specifically, taking the gas purification treatment device 100 shown in FIG. 1 as an example, the second mixed gas is introduced into the reaction cavity 131 in the light catalytic reactor 130 filled with the photocatalyst through the inlet pipe 132. The light source 114 emits the first light and the second light, wherein the unused second light enters the reaction cavity 131 of the light catalytic reactor 130 through the light transmittance component (e.g., the light transmittance sidewall) of the light oxidation reactor 110. Under the action of the second light, the genetic material nucleic acids of microorganisms such as bacteria, yeasts, viruses, molds, dust mites, etc. remaining in the second mixed gas absorb the energy of the second light. The nucleic acid is an important genetic material of microorganisms. When it is irradiated by the second light, its tissue structure is destroyed, and thymidine dimer (TT) is formed in DNA, and uracil dimer (UU) is formed in RNA, causing a result that it loses its ability to replicate and transcribe, then resulting in its death. The undecomposed component in the second mixed gas that has undergone the second-stage evolution treatment and the chain-breaking or ring-opening converted into small molecular organic compounds such as aldehydes, ketones, acids or esters is attached to the surface of the photocatalyst, and photocatalysis is carried out under the action of the second light for further chain scission or ring opening to generate smaller organic compounds, or be directly mineralized into inorganic compounds such as $CO_2$ and $H_2O$. In some embodiments, the second mixed gas is subjected to a third-stage purification treatment to finally obtain a purified gas.

In some embodiments, the purified gas may be discharged from the reaction cavity (e.g., the reaction chamber 131) of the photocatalytic reactor through the outlet pipe (e.g., the outlet pipe 133).

In some embodiments, if the components in the purified gas are lower than the threshold (e.g., the toluene mineralization rate reaches 100%), the purified gas may directly discharge through the outlet pipe (e.g., the gas outlet pipe 133) from the gas purification treatment. In some embodiments, if the components in the purified gas are above the threshold, further treatment is required. For example, the purified gas is passed into the next-stage purification treatment device.

In some embodiments, the next-stage purification treatment device may be a heating catalytic reactor, and the heating catalytic reactor is filled with a thermal catalyst. In some embodiments, the purified gas may be passed into the heating catalytic reactor filled with the thermal catalyst for a fourth-stage purification treatment.

In some embodiments, the thermal catalyst may be a Mn catalyst. Preferably, the thermal catalyst may be at least one of a MnO, a $MnO_2$ or other manganese oxides. More preferably, the thermal catalyst may be a $MnO_2$ catalyst.

In some embodiments, microwaves may be configured to heat the gas (e.g., the purified gas) in the heating catalytic reactor.

In some embodiments, in the presence of the thermal catalyst and under the action of microwaves emitted by the microwave transmitter, the fourth-stage purification treatment performs a thermal catalytic reaction on the purified gas to obtain a final purified gas. Specifically, taking the gas purification treatment device 100 shown in FIG. 3 as an example, the purified gas is introduced into the reaction cavity 151 in the heating catalytic reactor 150 filled with the thermal catalyst through the inlet pipe 152. The components in the third mixed gas are attached to the surface of the thermal catalyst, and under the action of the microwaves emitted by the microwave transmitter 140, the thermal catalyst is heated by the microwaves, so that the components in the third mixed gas are decomposed at high temperature and mineralized into $CO_2$, $H_2O$ and other inorganic substances. Under high temperature conditions, the residual bacteria, yeast, viruses, molds, dust mites and other microorganisms in the third gas mixture are destroyed, and the proteins, nucleic acids, active substances, etc. in these microbial cells are destroyed, thereby affecting the life activities of microorganisms, so as to achieve the goal of sterilization.

In some embodiments, the purified gas is subjected to a fourth-stage purification treatment to obtain a final purified gas, and the final purified gas may be discharged from the gas purification treatment device through the outlet pipe.

In some embodiments, after the above-mentioned third-stage or fourth-stage purification treatment, the mineralization rate of toluene in the VOCs gas is above 92%. Preferably, the mineralization rate of toluene in the VOCs gas may be more than 93%. Preferably, the mineralization rate of toluene in the VOCs gas may be more than 94%. Preferably, the mineralization rate of toluene in the VOCs gas may be more than 95%. Preferably, the mineralization rate of toluene in the VOCs gas may be more than 96%. Preferably, the mineralization rate of toluene in the VOCs gas may be more than 97%. Preferably, the mineralization rate of toluene in the VOCs gas may be more than 98%. Preferably, the mineralization rate of toluene in the VOCs gas may be more than 99%. Preferably, the mineralization rate of toluene in the VOCs gas may be more than 100%. It may be understood that if the gas after the third-stage purification treatment may meet the treatment requirements (that is, the mineralization rate of toluene in the VOCs gas is more than 92%), the fourth-stage purification treatment may not be performed; if the gas after the third-stage purification treatment does not meet the treatment requirements (that is, the mineralization rate of toluene in the VOCs gas is less than 92%), the fourth-stage purification treatment is also required.

In some embodiments, after the above-mentioned third-stage or fourth-stage purification treatment, the killing rate of any one of bacteria, yeast, viruses, molds, and dust mites at a certain volume space velocity is more than 90%. Preferably, the killing rate of any one of bacteria, yeasts, viruses, molds, and dust mites may be more than 91%. Preferably, the killing rate of any one of bacteria, yeasts, viruses, molds, and dust mites may be more than 92%. Preferably, the killing rate of any one of bacteria, yeasts, viruses, molds, and dust mites may be more than 93%. Preferably, the killing rate of any one of bacteria, yeasts, viruses, molds, and dust mites may be more than 94%. Preferably, the killing rate of any one of bacteria, yeasts, viruses, molds, and dust mites may be more than 95%. Preferably, the killing rate of any one of bacteria, yeasts, viruses, molds, and dust mites may be more than 96%. Preferably, the killing rate of any one of bacteria, yeasts, viruses, molds, and dust mites may be more than 97%. Preferably, the killing rate of any one of bacteria, yeasts, viruses, molds, and dust mites may be more than 98%. Preferably, the killing rate of any one of bacteria, yeasts, viruses, molds, and dust mites may be more than 99%. Preferably, the killing rate of any one of bacteria, yeasts, viruses, molds, and dust mites may be 100%. It may be understood that if the gas after the third-stage purification treatment may meet the treatment requirements (that is, the killing rate is more than 90%), the fourth-stage purification treatment may not be performed; if the gas after the third-stage purification treatment does not meet the treatment requirements (that is, the killing rate is less than 90% or more), the fourth-stage purification treatment is also required.

The volume space velocity may be the volume space velocity in the catalytic ozonation reactor. In some embodiments, the volume space velocity may include 100-100-00H$^{-1}$. Preferably, the volume space velocity may include 500-9500H$^{-1}$. Preferably, the volume space velocity may include 1000-9000H$^{-1}$. Preferably, the volume space velocity may include 1500-8500H$^{-1}$. Preferably, the volume space velocity may include 2000-8000H$^{-1}$. Preferably, the volume space velocity may include 2500-7500H$^{-1}$. Preferably, the volume space velocity may include 3000-7000H$^{-1}$. Preferably, the volume space velocity may include 3500-6500H$^{-1}$. Preferably, the volume space velocity may include 4000-6000H$^{-1}$. Preferably, the volume space velocity may include 4500-5500H$^{-1}$. Preferably, the volume space velocity may include 4800-5300H$^{-1}$. Preferably, the volume space velocity may include 5000-5100H$^{-1}$. In some embodiments, when the killing rate of any one of bacteria, yeasts, viruses, molds, and dust mites is less than 100%, the volume space velocity is negatively correlated with the killing rate. Specifically, when the killing rate of any one of bacteria, yeasts, viruses, molds, and dust mites is less than 100%, the larger the volume space velocity, the smaller the killing rate, and the smaller the volume space velocity, the greater the killing rate.

It may be seen from this that, in order to better purify the gas, a smaller gas flow rate and a longer time may be used, so that after the third-stage or fourth-stage purification treatment, the mineralization rate of VOCs gas components is higher, the killing rate of biological pollutants is higher, and the purification treatment effect is better.

Through the fourth-stage purification treatment, the treatment effect of the gas may be further ensured, and a higher mineralization rate or complete mineralization may be achieved. In order to save energy consumption, the opening of the heating catalytic reactor may also be controlled according to the gas treatment requirements. Specifically, if the vacuum ultraviolet photolysis and the light oxidation, the catalytic ozone oxidation and the photocatalytic processes may achieve complete mineralization, it is not necessary to start the heating catalytic reactor. For example, the outlet pipe of the heating catalytic reactor and the photocatalytic reactor may be disconnected, so that the gas after the third-stage purification treatment is discharged through the outlet pipe of the photocatalytic reactor; if the vacuum ultraviolet photolysis and the light oxidation, the catalytic ozone oxidation and the photocatalytic processes are not complete on the gas treatment, the heating catalytic reactor is then communicated with the photocatalytic reactor to activate the heating catalytic reactor.

It should be noted that the above description of the process 600 is only for embodiments and illustration, and does not limit the scope of application of the present disclosure. For technicians in the art, under the guidance of this present disclosure, various amendments and changes may be made on the process 600. However, these amendments and changes are still within the scope of this present disclosure. For example, operation 640 may be increased, and the fourth-level purification treatment may be performed on the gas. For another example, the fourth stage purification treatment may be placed before the operation 610. For another example, the microwave emitter 140 may be eliminated, and the ultraviolet light in the light oxidation reactor 110 is a conventional ultraviolet light to provide ultraviolet light of the required wavelength (a vacuum ultraviolet light with wavelength ≤185 nm and an ultraviolet light with wavelength ≤254 nm). The gas purification treatment using the purification treatment device of this structure is similar to the method for the gas purification treatment using the gas purification treatment device 100 shown in FIG. 1, including: passing the gas into the light oxidation reactor 110, and performing photolysis and photo-oxidation reaction (e.g., first-stage purification treatment) under irradiation of vacuum ultraviolet light with a wavelength less than or equal to 185 nm, to obtain the first mixed gas containing ozone; passing the first mixed gas into the catalytic ozone oxidation reactor 120 filled with an ozone oxidation catalyst to perform catalytic ozone oxidation reaction to obtain a second mixed gas (e.g., the second-stage purification treatment); and then passing the second mixed gas into the light catalytic reactor 130 filled with the photocatalyst, under irradiation of ultraviolet light with a wavelength less than or equal to 254 nm, performing the photocatalytic reaction (e.g., the third-stage purification treatment).

In order to further verify the effect of the gas purification treatment device, a series of application effect experiments are performed. The application effect experiment includes experimental group 1, experimental group 2, comparison group 11, comparison group 12, comparison group 21 and comparison group 22. The experimental group 1 and the experimental group 2 purify the gas according to the light oxidation-catalytic ozone oxidation-photocatalytic process, and the microwave power of the experimental group 1 and the experimental group 2 is different. The comparison group 11 and the comparison group 12 are subjected to the gas purification treatment according to the light oxidation-catalytic ozone oxidation process, and the microwave power of the comparison group 11 and the comparison group 12 is different. The comparison group 21 and the comparison group 22 are subjected to the gas purification treatment according to the light oxidation-photocatalysis process, and the microwave power of the comparison group 21 and the comparison group 22 is different.

The gas to be treated in the application effect experiment is as follows: toluene concentration of 20 ppm, gas flow rate of 200 mL/min, oxygen content of 21%, and relative humidity of 70%. Since toluene is a more difficult component in the VOCs gas, it is representative in gas purification treatment experiments.

The degradation rate refers to the degree to which the components of the original gas are decomposed into other substances during the gas purification treatment. The mineralization rate refers to the degree to which the organic carbon-containing components in the original gas are converted into inorganic carbon components during the gas purification treatment.

By testing the concentration of toluene in the gas before and after the purification treatment of each application effect experiment, the concentration of CO and $CO_2$ in the gas after purification, and the degradation rate and mineralization rate of toluene are calculated according to the following formulas, to evaluate the removal effect of each process on toluene.

(1) Dedegradation rate of toluene:

$$\eta = \frac{c(C_7H_8)_{in} - c(C_7H_8)_{out}}{c(C_7H_8)_{in}} \times 100\%.$$

In the formula, $c(C_7H_8)_{in}$ is the concentration of toluene before the purification treatment, ppm;

$c(C_7H_8)_{out}$ is the concentration of toluene after the purification treatment, ppm.

(2) The mineralization rate of toluene:

$$\gamma = \frac{c(CO)_{out} + c(CO_2)_{out} - c(CO)_{in} - c(CO_2)_{in}}{7 \times c(C_7H_8)_{in}} \times 100\%.$$

In the formula, $c(CO)_{out}$ is the concentration of CO in the gas after the purification treatment, ppm;

$c(CO_2)_{out}$ is the concentration of CO2 in the gas after the purification treatment, ppm;

$c(CO)_{in}$ is the concentration of CO in the gas before the purification treatment, ppm;

$c(CO_2)_{in}$ the concentration of $CO_2$ in the gas before the purification treatment, ppm;

$c(C_7H_8)_{in}$ is the concentration of toluene before the purification treatment, ppm.

By adopting the above method to perform the gas purification treatment effect test, the obtained results are shown in Table 1 below:

As shown in Table 1, under the condition of the same microwave power of 228 W, the toluene mineralization rate of the comparative group 11 using the light oxidation-catalytic ozone oxidation process is 47.1%, the mineralization rate of toluene in the comparative group 21 using the light oxidation-photocatalysis process is 81.1%, the mineralization rate of toluene in the experimental group 1 using the light oxidation-catalytic ozone oxidation-photocatalytic composite process is 83.3%. It may be seen from this that when the experimental group 1 using the light oxidation-catalytic ozone oxidation-photocatalytic composite process is configured for the gas purification treatment, the treatment efficiency is high, the mineralization rate is high, that is, when the light oxidation-catalytic ozone oxidation-photocatalytic composite process is used, the conversion efficiency of toluene into CO and $CO_2$ is higher.

As shown in Table 1, under the condition of the same microwave power of 147.75 W, the toluene mineralization rate of the comparative group 12 using the light oxidation-catalytic ozone oxidation process is 39.5%, the toluene mineralization rate of the comparative group 22 using the light oxidation-photocatalytic process is 66.2%, the mineralization rate of toluene in the experimental group 2 using the light oxidation-catalytic ozone oxidation-photocatalytic composite process is 70.3%. It may be seen from this that when the light oxidation-catalyzed ozone oxidation-photocatalytic composite process is used for the gas purification treatment, the treatment efficiency is high, the mineralization rate is high, that is, when the light oxidation-catalytic ozone oxidation-photocatalytic composite process is used, the conversion efficiency of toluene into CO and $CO_2$ is higher.

As shown in Table 1, under the same process conditions: (1) Under the conditions of light oxidation-catalytic ozone oxidation process, the mineralization rate of toluene of the comparative group 11 with a power of 228 W is 47.1%, the toluene mineralization rate of the comparative group 12 with a power of 147.75 W is 39.5%; (2) Under the condition of light oxidation-photocatalysis process, the mineralization rate of toluene of the comparative group 21 with a power of 228 W is 81.1%, the toluene mineralization rate of the comparative group 22 with a power of 147.75 W is 66.2%;

TABLE 1

| Test results of gas purification treatment effect | | | |
| --- | --- | --- | --- |
| | | Test results | |
| Purification process | Initial exhaust parameters | Degradation rate (%) | Mineralization rate (%) |
| Experimental group 1 (Microwave power 228 W) | Toluene concentration 20 ppm, Gas flow 200 mL/min, | 96.8 | 83.3 |
| Experimental group 2 (Microwave power 147.75 W) | Oxygen content 21%, Relative humidity 70%. | 96.5 | 70.3 |
| Comparison group 11 (Microwave power 228 W) | | 99.5 | 47.1 |
| Comparison group 12 (Microwave power 147.75 W) | | 98.6 | 39.5 |
| Comparison group 21 (Microwave power 228 W) | | 97 | 81.1 |
| Comparison power 22 (Microwave power 147.75 W) | | 98.5 | 66.2 |

(3) Under the condition of light oxidation-catalytic ozone oxidation-photocatalytic composite process, the toluene mineralization rate of experimental group 1 with 228 W power is 83.3%, the toluene mineralization rate of experimental group 2 with a power of 147.75 W is 70.3%. It may be seen that under any two or three composite processes, when the gas purification treatment is performed with a power of 228 W, the treatment efficiency is high and the mineralization rate is high. It may be understood that higher energy is beneficial to generate ultraviolet and visible light, and stimulate the activity of the catalyst, making the conversion of toluene into CO and $CO_2$ more efficient.

In order to better explain the effect of light oxidation-catalytic oxidation-photocatalytic composite process for the gas purification treatment, the following comparison experimental group is once again designed: (1) Experimental group A: Microwave power 147.75 W, using the light oxidation process; (2) Experimental group B: Microwave power 147.75 W, using the catalytic ozone oxidation technology, and the ozone oxidation catalyst is 0.15 g; (3) Experimental group C: Microwave power 147.75 W, using the photocatalytic process; (4) Experimental group D: Microwave power 147.75 W, using light oxidation-catalytic ozone oxidation technology, the amount of the oxygen oxidation catalyst is 0.3 g; (5) Experimental group E: Microwave power 147.75 W, using light oxidation-photocatalytic process; (6) Experimental group F: Microwave power 147.75 W, using light oxidation-catalytic ozone oxidation-photocatalytic composite process, the amount of the ozone oxidation catalyst is 0.3 g. The parameters of the gas to be treated in the above experimental groups are: toluene concentration of 5 ppm, gas flow rate of 200 mL/min, oxygen content of 21%, and relative humidity of 70%. Each experimental group is tested in the gas purification treatment device 100. The results of the degradation rate and mineralization rate of each experimental group are shown in Table 2. The composition and content of the gas residues after treatment in each experimental group are shown in Table 3. The composition and content of the gas residues in each experimental group after treatment are passed through the gas chromatography-mass spectrometer (GC-MS) after the reaction of each experimental group is completed.

TABLE 3

The composition and relative content of gas residues after the gas purification in each experimental group

| Group | Reaction products (relative content of each component) |
|---|---|
| Experimental group A | 3.2% phenol, 13.8% benzaldehyde, 40.6% benzoic acid, 4.4% benzene, 0.9% benzyl alcohol, 0.4% p-xylene, 2.8% 2-methylphenol, 0.5% phthalic acid, 1.4% heptanal, 1.0% hexanol, 1.0% hexanal, 0.4% 6-hydroxy-2-hexanone, 0.4% 2-carbonylpropionic acid, 19.9% acetic acid, 9.3% formic acid. |
| Experimental group B | 5.8% benzyl alcohol, 26.6% benzaldehyde, 29.1% benzoic acid, 38.5% benzene. |
| Experimental group C | 1.5% p-xylene, 12.0% benzaldehyde, 83.5% benzoic acid, 1.5% benzene, 1.5% formic acid. |
| Experimental group D | 4.9% phenol, 24.2% benzaldehyde, 11.7% benzoic acid, 22.7% benzene, 7.6% benzyl alcohol, 1.0% acetophenone, 6.5% 2-hydroxybenzaldehyde, 10.0% heptanal, 5.9% hexanol, 5.5% hexyl aldehyde. |
| Experimental group E | 9.7% benzaldehyde, 64.0% benzoic acid, 22.8% benzene, 3.5% acetophenone. |
| Experimental group F | 7.6% benzaldehyde, 72.6% benzoic acid, 6.8% benzene, 0.8% 2-formaldehyde benzoic acid, 4.7% acetophenone, 1.7% methoxytoluene, 4.3% phenylacetic acid, 1.5% formic acid. |

As shown in Table 2, the analysis shows that: (1) Under the same reaction conditions, in the experimental group A using a single light oxidation process, the mineralization rate of toluene is only 31.4%. Compared with the experimental group A, the toluene mineralization rates of the experimental group D using the light oxidation-catalytic ozone oxidation process and the experimental group E using the light oxidation-photocatalytic process is 55.3% and 81.5%, respectively. It shows that compared with the single process, the combined process of light oxidation-catalytic ozone oxidation and photo-oxidation-photocatalysis has a synergistic effect, and the multi-cascade purification treatment process has higher mineralization rate and better treatment effect than the single process. (2) Compared with the experimental group A, the toluene mineralization rate of the experimental group F using the light oxidation-catalytic ozone oxidation-photocatalytic process is 92.8%, this is because the photocatalytic process may reuse the by-product ozone in the light

TABLE 2

The effect of the gas purification treatment in each experimental group

| Group | Process | Reaction conditions | Degradation rate (%) | Mineralization rate (%) |
|---|---|---|---|---|
| Experimental group A | Light oxidation | Microwave power 147.75 W | 98.1 | 31.4 |
| Experimental group B | Catalytic ozone oxidation | Ozone oxidation catalyst 0.15 g; Microwave power 147.75 W; Ozone concentration 35 ppm; | 63.5 | 22.6 |
| Experimental group C | Photocatalysis | Microwave power 147.75 W | 85.6 | 47.2 |
| Experimental group D | Light oxidation - Catalytic Ozone Oxidation | Microwave power 147.75 W; ozone oxidation catalyst 0.3 g. | 97.8 | 55.3 |
| Experimental group E | Light oxidation - Photocatalysis | Microwave power 147.75 W | 98.5 | 81.5 |
| Experimental group F | Light oxidation - Catalytic Ozone Oxidation - Photocatalysis | Microwave power 147.75 W; ozone oxidation catalyst 0.3 g. | 97.2 | 92.8 | oxidation process and the ultraviolet light with poor photolysis effect (generally, the wavelength is less than or equal to 254 nm). Therefore, the mineralization rate of toluene is increased to 92.8%, which improves the purification efficiency. And because the ozone is used, it is ensured that there is no ozone in the gas finally discharged from the gas purification treatment device, and no ozone leakage is ensured in the whole process. (3) The sum of the toluene mineralization rate of the experimental group A using a single light oxidation process, the experimental group B of the catalytic ozone oxidation process and the experimental group C of the photocatalytic process is 101.2%, and the toluene mineralization rate of experimental group F using light oxidation-catalytic ozone oxidation-photocatalytic process is 92.8%. That is to say, the mineralization rate of toluene combined by the light oxidation-catalytic ozone oxidation-photocatalytic process is less than the sum of the toluene mineralization rates of the three single processes, mainly because the ozone is completely purified in the catalytic ozone oxidation process section. There is no synergistic contribution of strong ozone oxidation in the photocatalytic process, so that the mineralization rate of the photocatalytic process is lower than the theoretical value, but the mineralization rate of toluene obtained by the composite treatment of light oxidation-catalytic ozone oxidation-photocatalytic process is higher. However, combined with the experimental test results in Table 2 and Table 1, it may be seen that the mineralization rate of toluene may be further improved by appropriately increasing the microwave power.

As shown in Table 3: (1) In experimental group A, there are many benzene series compounds in the gas residue after the gas to be treated by the light oxidation process, among which benzaldehyde and benzoic acid account for a larger proportion, accounting for 13.8% and 40.6% respectively, there are also many chain organics, and acetic acid and formic acid account for a larger proportion, accounting for 19.9% and 9.3% respectively; (2) In the experimental group B, the gas residues of the gas to be treated by the catalytic ozone oxidation process are all benzene series, and the proportion of benzene is relatively large, and the proportion of benzene is 38.5%; (3) In the experimental group C, the gas residues of the gas to be treated by the photocatalytic process are mainly benzene series, and the chain organic matter is only formic acid, and the proportion of benzoic acid reaches 83.5%; (4) In experiment D, the gas residues after the light oxidation-catalyzed ozone oxidation process of the gas to be treated are benzene series and long-chain organic compounds, among which benzaldehyde, benzoic acid and benzene account for a larger proportion, accounting for 24.2% and 11.7% and 22.7% respectively; (5) In the experimental group E, the gas residues after the light oxidation-photocatalysis process of the gas to be treated are all benzene series, and the proportions of benzoic acid and benzene are relatively large, accounting for 64.0% and 22.8%, respectively; (6) In the experimental group F, the gas residues after the light oxidation-catalytic ozone oxidation-photocatalytic composite process of the gas to be treated is basically benzene series, and there is a small amount of formic acid, the largest proportion of benzoic acid is 72.6%. It may be seen that the light oxidation technology helps degrade toluene; in addition, during the degradation process of the gas to be treated, although the content of the original volatile organic pollutants (for example, toluene) is reduced after decomposition, the decomposed products (for example, benzoic acid, benzene, etc.) are still harmful. Therefore, only by increasing the mineralization rate of volatile organic pollutants in the gas treatment process may the organic carbon pollutants be truly converted into harmless inorganic carbon products (for example, CO or $CO_2$), otherwise, it may cause more serious pollution and harm after discharge. Furthermore, since the mineralization rate is calculated as the content of inorganic carbon products (e.g., CO or $CO_2$) in the outlet gas, the gas treatment efficiency may be better characterized relative to the toluene degradation rate.

In addition, in order to verify the poisoning and regeneration performance of the gas purification treatment device 100 in the gas treatment process, the poisoning and regeneration of the light oxidation-ozone catalytic oxidation-photocatalytic composite process are studied under the condition of low mineralization rate. In some embodiments, the gas purification treatment device 100 is used, and the light oxidation-catalytic ozone oxidation-photocatalytic composite process is used. The microwave power is 147.75 W, the relative humidity is 70%, the oxygen content is 21%, along-term operation experiment is performed under the reaction conditions with an initial toluene concentration of 20 ppm to test the removal effect of toluene. The results are shown in FIG. 7.

Figure 7:
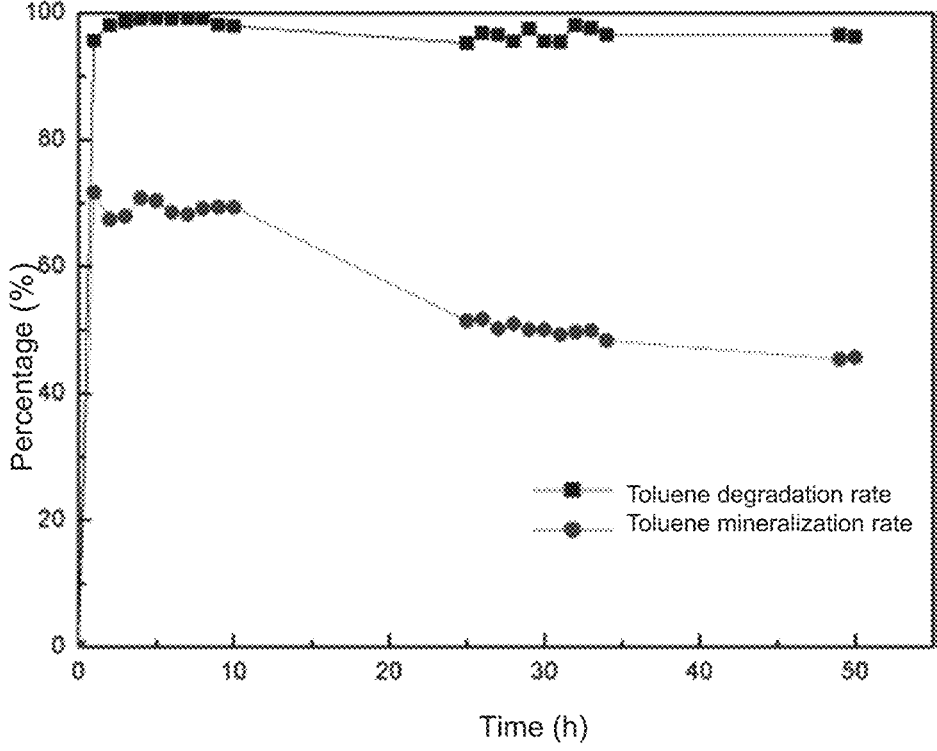
FIG. 7 is a long-term experimental effect diagram of an exemplary gas purification treatment device according to some embodiments of the present disclosure.

As shown in FIG. 7, with the extension of operation time, the degradation rate of toluene decreased slightly, but remained above 96%, while the mineralization rate of toluene gradually decreased. At 50 h of operation, the mineralization rate of toluene decreased from the initial 70.3%. to 45.6%. It may be seen from this that the catalyst (e.g., ozone oxidation catalyst or photocatalyst) in the light oxidation-ozone catalytic oxidation-photocatalytic composite process is in a poisoned state.

After the gas purification treatment device 100 operates for 50 hours, stop the toluene flow, pass through 200 mL/min of dry air, turn on the microwave non-pole light, perform in-situ regeneration of the catalyst, and detect the amount of toluene desorption and $CO_x$ (including CO and $CO_2$) generated by the in-situ regeneration of the catalyst. The results are shown in FIG. 8.

Figure 8:
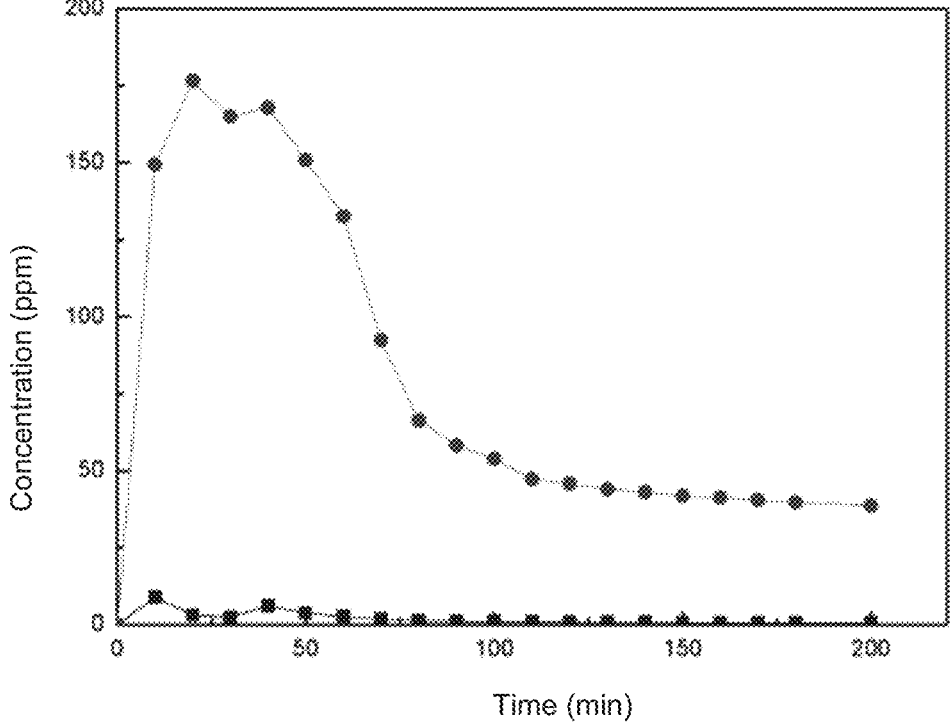
FIG. 8 is a curve diagram showing a variation of toluene desorption amount and $CO_x$ generation amount of catalyst in-situ regeneration after a long-term operation of an exemplary gas purification treatment device according to some embodiments of the present disclosure.

As shown in FIG. 8, in the first 60 minutes, there was a small amount of toluene at the outlet pipe 133, and after 60 minutes, the toluene concentration at the outlet pipe 133 was almost zero, and the production of $CO_x$ increased rapidly within 20 minutes, and then gradually decreased. It shows that the catalyst in-situ regeneration is completed.

In order to study the performance of degrading toluene after regeneration of the gas purification treatment device 100, the experiment is performed again under the conditions of relative humidity of 70%, oxygen content of 21%, microwave power of 147.75 W, gas flow rate of 200 mL/min, and initial concentration of toluene of 20 ppm. The experimental results are shown in FIG. 9.

Figure 9:
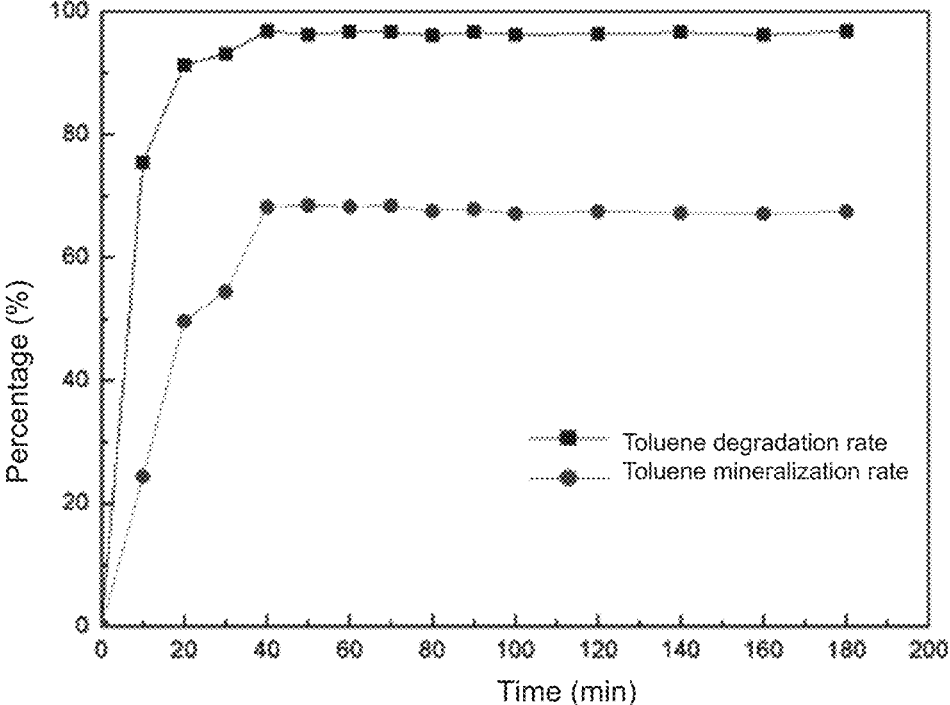
FIG. 9 is a performance effect graph of removing toluene after in-situ catalyst regeneration after a long-term operation of an exemplary gas purification treatment device according to some embodiments of the present disclosure.

As shown in FIG. 9, after the regenerated gas purification treatment device 100 operates stably, the degradation rate of p-toluene remains stable, and is basically maintained at more than 95%; the toluene mineralization rate only dropped from the initial 70.3% to 67.4% and remained stable. It is proved that the light oxidation-ozone catalytic oxidation-photocatalytic composite process system has a good effect on gas purification after regeneration.

In order to illustrate the purification effect of light oxidation-catalytic ozone oxidation-photocatalytic composite process on biological pollutants, the following experiments were designed again: under the conditions of humidity of 70%, oxygen content of 21%, microwave power of 147.75 W, and gas flow of 200 mL/min (the concentration of microbial aerosol is 105 $CFU/m^3$), the gas was passed into the gas purification treatment device 100 in FIG. 1 to conduct the experiment again. By measuring the content of Escherichia coli at the outlet of the gas purification treatment device 100, it is calculated that the sterilization rate of Escherichia coli by the purification treatment device 100 may reach 95%. It shows that the light oxidation-ozone catalytic oxidation-photocatalytic composite process has a good effect on the purification and treatment of biological pollutants.

The possible beneficial effects of the embodiments of the present application include, but are not limited to: (1) first light and second light are generated by emitting microwaves from the microwave emitter to excite the ultraviolet light, and the first light is used in the light oxidation reactor to perform the first light and the second light, and in the photocatalytic reactor, the second light passing through the light-transmittance component is configured to perform the third-stage purification treatment, so that the gas purification treatment device may make multiple use of the light emitted by the ultraviolet light, improve the utilization rate of the light source and save the energy; (2) The ultraviolet light in the light oxidation reactor may be excited by emitting microwaves to generate the first light and the second light, which may enhance the activity of the photocatalyst in the photocatalytic reactor, and may also heat the heating catalytic reactor. Therefore, the purification effect of the three reactors may be triggered by a single microwave transmitter, which makes the gas purification treatment device more integrated, improves the gas purification efficiency and reduces the energy consumption; (3) The ozone generated in the light oxidation reactor may be used as a strong oxidant in the catalytic ozone oxidation reactor, and may also be further used as a strong oxidant in the photocatalytic reactor, so that there is no ozone in the purified gas. The gas purification treatment device has the functions of efficient use of ozone and zero leakage of ozone; (4) The poisoning regeneration experiment of the gas purification treatment device shows that the catalyst in the gas purification treatment device has a specific in-situ regeneration capability after poisoning, which makes the gas purification treatment device have better industrial application value; (5) By setting up a heating catalytic reactor, when the gas of the third-stage purification treatment does not meet the standard, the fourth-stage purification treatment is performed to further ensure the gas treatment efficiency and processing capacity of the gas purification treatment device; (6) The gas purification treatment device fully combines various single disinfection and sterilization technologies (vacuum ultraviolet sterilization technology, ozone sterilization technology, $MnO_2$ catalytic ozone sterilization technology, $TiO_2$ photocatalytic sterilization technology, $MnO_2$ thermal catalytic sterilization technology, etc.), and may achieve a significant increase in the efficiency of disinfection and sterilization under the unit energy consumption.

It should be noted that different embodiments may have different beneficial effects. In different embodiments, the possible beneficial effects may include any combination of one or more of the above, or any other possible beneficial effects that may be obtained.

Some embodiments of the present disclosure and/or some other embodiments are described above. Different modifications may also be made in the present disclosure according to above content. The subject matter disclosed in the present disclosure may be implemented in different forms and embodiments, and the present disclosure may be applied to a large number of applications. All applications, modifications and changes claimed in the following claims belong to the scope of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it should be emphasized and noted that "one embodiment", "an embodiment", "an alternative embodiment", or "another embodiment" mentioned twice or more in different positions in the present disclosure do not necessarily refer to the same embodiment. In addition, some features, structures, or features in the present disclosure of one or more embodiments may be appropriately combined.

Those skilled in the art will appreciate that there may be a variety of variations and improvements in the contents disclosed herein. For example, the different system components described above are implemented by hardware devices, but may also be implemented only by software solutions. For example, a system may be installed on an existing server. Further, the location information disclosed herein may be provided through a firmware, a combination of firmware/software, a combination of firmware/hardware, or a combination of hardware/firmware/software.

All software or some of them may sometimes communicate via the network, such as the Internet or other communication networks. Such communication may load software from one computer device or processor to another computer device or processor. For example, a hardware platform loaded from a management server or host computer of a radiotherapy system to a computer environment, or other computer environment for realizing the system, or a system with similar functions related to providing information required to determine the target structure parameters of a wheelchair. Therefore, another medium that may transmit software elements may also be used as a physical connection between local devices. For example, light waves, electric waves, electromagnetic waves, etc., spread through cables, optical cables or air. The physical media used for carrier waves, such as cables, wireless connections, or optical cables, may also be considered as media carrying software. Unless the usage herein limits the tangible "storage" medium, other terms that refer to the computer or machine "readable medium" all refer to the medium that participates in the process of executing any instructions by the processor.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program encoding may be run on the user's computer, or as a separate package runs on the user's computer, or part is running on the user's computer, or running on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. In addition to the application history documents that are inconsistent or conflicting with the contents of the present disclosure, the documents that may limit the widest range of the claim of the present disclosure (currently or later attached to this application) are excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the present disclosure are merely illustrative of the principles of the embodiments of the present disclosure.

Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A device for gas purification treatment, wherein the device comprises:
   a light oxidation reactor, a light source being disposed in the light oxidation reactor, the light source being configured to emit first light and second light, the light oxidation reactor being configured to perform a first-stage purification treatment on a gas under irradiation of the first light;
   a catalytic ozone oxidation reactor that is filled with an ozone oxidation catalyst, and in fluid communication with the light oxidation reactor, the catalytic ozone oxidation reactor being configured for second-stage purification treatment of the gas;
   a microwave transmitter for exciting the light source to emit the first light and the second light; and
   a photocatalytic reactor that is filled with a photocatalyst and in fluid communication with the catalytic ozone oxidation reactor, the photocatalytic reactor being configured to perform a third-stage purification treatment on the gas under irradiation of the second light; wherein,
   the photocatalytic reactor is adjacent to the light oxidation reactor, and the photocatalytic reactor and the light oxidation reactor are separated by a light transmittance component, so that the second light passes through the light transmittance component into the photocatalytic reactor.

2. The device of claim 1, wherein the first light is vacuum ultraviolet light (VUV); and the second light is ultraviolet (UV) light.

3. The device of claim 2, wherein the photocatalyst is selected from one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, and a $Sn/S/F/TiO_2/SnO_2$ composite catalyst.

4. The device of claim 1, wherein the first light is vacuum ultraviolet light; and the second light is ultraviolet light and visible light.

5. The device of claim 4, wherein the photocatalyst is selected from one or more of a $TiO_2$ catalyst, a $TiO_2/SiO_2$ composite catalyst, a $F/TiO_2/SiO_2$ composite catalyst, a $Bi/F/TiO_2/SiO_2$ composite catalyst, a $S/F/TiO_2/SiO_2$ composite catalyst, a $S/Bi/F/TiO_2/SiO_2$ composite catalyst, a $Sn/S/F/TiO_2$ composite catalyst, a $Sn/S/F/TiO_2/SnO_2$ composite catalyst, and a $BiVO_4$ catalyst; the $BiVO_4$ catalyst being filled in a side of the photocatalytic reactor away from the light oxidation reactor, and one or more of the $TiO_2$ catalyst, the $TiO_2/SiO_2$ composite catalyst, the $F/TiO_2/SiO_2$ composite catalyst, the $Bi/F/TiO_2/SiO_2$ composite catalyst, the $S/F/TiO_2/SiO_2$ composite catalyst, the $S/Bi/F/TiO_2/SiO_2$ composite catalyst, the $Sn/S/F/TiO_2$ composite catalyst, and the $Sn/S/F/TiO_2/SnO_2$ composite catalyst being filled in a side of the photocatalytic reactor close to the light oxidation reactor.

6. The device of claim 1, wherein the ozone oxidation catalyst is selected from one or more of a transition metal oxide and a composite catalyst of a transition metal oxide and a molecular sieve.

7. The device of claim 6, wherein the ozone oxidation catalyst is selected from one or more of a $MnO_2$ catalyst and a composite catalyst of $MnO_2$/molecular sieve.

8. The device of claim 1, further comprising a heating catalytic reactor that is filled with a thermal catalyst and in fluid communication with the light oxidation reactor for a fourth stage purification treatment of the gas.

9. The device of claim 8, wherein the heating catalytic reactor performs microwave heating through the microwave transmitter.

10. The device of claim 1, wherein the microwave transmitter emits microwaves to the photocatalytic reactor.

11. The device of claim 1, wherein the light oxidation reactor is provided with an installation bracket for installation of the light source.

12. A method for gas purification treatment performed using a device for gas purification treatment, the device including:

a light oxidation reactor, a light source being disposed in the light oxidation reactor, the light source being configured to emit first light and second light, the light oxidation reactor being configured to perform a first-stage purification treatment on a gas under irradiation of the first light;

a catalytic ozone oxidation reactor that is filled with an ozone oxidation catalyst, and in fluid communication with the light oxidation reactor, the catalytic ozone oxidation reactor being configured for second-stage purification treatment of the gas;

a microwave transmitter for exciting the light source to emit the first light and the second light; and a photocatalytic reactor that is filled with a photocatalyst and in fluid communication with the catalytic ozone oxidation reactor, the photocatalytic reactor being configured to perform a third-stage purification treatment on the gas under irradiation of the second light; wherein, the photocatalytic reactor is adjacent to the light oxidation reactor, and the photocatalytic reactor and the light oxidation reactor are separated by a light transmittance component, so that the second light passes through the light transmittance component into the photocatalytic reactor;

the method comprising:

putting the gas into the light oxidation reactor;

obtaining a first mixed gas by performing the first-stage purification treatment on the gas under the irradiation of the first light;

putting the first mixed gas into the catalytic ozone oxidation reactor filled with the ozone oxidation catalyst, obtaining a second mixed gas by performing the second-stage purification treatment on the first mixed gas;

putting the second mixed gas into the photocatalytic reactor filled with the photocatalyst;

obtaining a purified gas by performing the third-stage purification treatment on the second mixed gas under the irradiation of the second light; wherein, the first light and the second light come from the same light source.

13. The method of claim 12, wherein the gas includes volatile organic compounds (VOCs) gas.

14. The method of claim 13, wherein a mineralization rate of toluene in the VOCs gas is more than 92%.

15. The method of claim 12, wherein the gas includes at least one of bacteria, yeast, virus, mold, and dust mites.

16. The method of claim 15, wherein the method is configured to purify at least one of the bacteria, the yeast, the virus, the mold, and the dust mites.

17. The method of claim 16, wherein, a killing rate of any one of the bacteria, the yeast, the virus, the mold, and the dust mites is more than 90%.

18. The method of claim 17, wherein, the volume space velocity includes $100\text{-}10000H^{-1}$.

19. The method of claim 17, wherein, when the kill rate is less than 100%, the volume space velocity is negatively correlated with the kill rate.

* * * * *